(12) United States Patent
Biswas et al.

(10) Patent No.: US 12,536,398 B2
(45) Date of Patent: Jan. 27, 2026

(54) METHOD AND APPARATUS FOR FAULT DIAGNOSIS IN AN RFID SYSTEM

(71) Applicant: Hand Held Products, Inc., Charlotte, NC (US)

(72) Inventors: Gourango Lal Biswas, Charlotte, NC (US); Pankaj Kumar Pandey, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 37 days.

(21) Appl. No.: 18/417,420

(22) Filed: Jan. 19, 2024

(65) Prior Publication Data

US 2024/0256817 A1    Aug. 1, 2024

(30) Foreign Application Priority Data

Feb. 1, 2023    (IN) .............................. 202311006536

(51) Int. Cl.
*G06K 19/07*    (2006.01)
*G06K 7/00*    (2006.01)

(52) U.S. Cl.
CPC ....... *G06K 19/0723* (2013.01); *G06K 7/0008* (2013.01)

(58) Field of Classification Search
CPC ............. G06K 19/0723; G06K 7/0008; G06K 7/10465; G06K 7/10356; H04Q 2209/47;
(Continued)

(56) References Cited

U.S. PATENT DOCUMENTS

| 5,640,151 A | * | 6/1997 | Reis ........................ G01S 13/74 |
| | | | 340/8.1 |
| 6,903,656 B1 | * | 6/2005 | Lee .................... G06K 7/10316 |
| | | | 340/572.1 |

(Continued)

FOREIGN PATENT DOCUMENTS

| CN | 111611819 A | 9/2020 |
| WO | WO-2007094787 A1 * | 8/2007 ........... G06K 7/0008 |

OTHER PUBLICATIONS

Extended European Search Report Mailed on Jun. 19, 2024 for EP Application No. 23220353, 7 page(s).
(Continued)

*Primary Examiner* — Nam V Nguyen
(74) *Attorney, Agent, or Firm* — Alston & Bird LLP

(57) ABSTRACT

Methods, apparatuses and systems for an RFID system are disclosed herein. An example system may include one or more of antennas, each antenna including an RF power comparator for comparing the power level indicator of the RF signal of the antenna with an RF signal power threshold, a bias voltage comparator for comparing a bias voltage of the antenna with a bias voltage threshold, an RF fault bypass circuit functioning as an approximate open circuit when the bias voltage of the antenna is equal to or higher than the bias voltage threshold, and as an approximate short circuit when the bias voltage of the antenna is lower than the bias voltage threshold. The RFID system may include an RFID reading circuitry for determining a fault in the RFID system using any of the RF power comparison, bias voltage comparison, and function of the RF fault bypass circuit.

19 Claims, 11 Drawing Sheets

(58) Field of Classification Search
CPC ...... H01Q 1/2216; H04B 17/17; H04B 17/29; G08B 13/14
USPC .............................................. 340/10.1, 10.5
See application file for complete search history.

(56) References Cited

U.S. PATENT DOCUMENTS

| | | | |
|---|---|---|---|
| 7,592,816 B2 | 9/2009 | Edwards | |
| 7,750,812 B2 * | 7/2010 | Campero | H01Q 1/2225 340/572.1 |
| 8,217,760 B2 * | 7/2012 | Wild | G06K 7/10178 340/10.5 |
| 8,810,371 B2 * | 8/2014 | Murdoch | G06K 7/0008 340/10.41 |
| 10,185,849 B2 * | 1/2019 | Martinez | G06K 7/10356 |
| 10,445,540 B2 | 10/2019 | Martinez et al. | |
| 10,474,852 B2 | 11/2019 | Bolic et al. | |
| 11,438,080 B2 | 9/2022 | Leaf et al. | |
| 11,451,310 B1 * | 9/2022 | Shah | G01R 21/00 |
| 2002/0190845 A1 | 12/2002 | Moore | |
| 2005/0128159 A1 * | 6/2005 | Wang | H04B 7/0848 455/63.1 |
| 2005/0143020 A1 * | 6/2005 | Ren | H04B 1/44 455/78 |
| 2006/0220876 A1 | 10/2006 | Campero et al. | |
| 2009/0284354 A1 * | 11/2009 | Pinkham | G06K 7/10356 340/10.3 |

OTHER PUBLICATIONS

Communication about intention to grant a European patent Mailed on Aug. 20, 2025 for EP Application No. 23220353, 6 page(s).

* cited by examiner

METHOD AND APPARATUS FOR FAULT DIAGNOSIS IN AN RFID SYSTEM

CROSS-REFERENCE TO RELATED APPLICATIONS

This application claims priority pursuant to 35 U.S.C. 119(a) to Indian Application No. 202311006536, filed Feb. 1, 2023, which application is incorporated herein by reference in its entirety.

BACKGROUND

Radio frequency identification (RFID) system may be used to account for and/or track various objects such as items in an inventory and/or in a warehouse, parts in an assembly line, boxes on a delivery truck, etc. Various antennas may be used to send and/or receive radio frequency signals used for detection. In some instances, however, a component of the RFID system or a component of one of the antennas may fail.

Applicant has identified many technical challenges and difficulties associated with RFID systems. Through applied effort, ingenuity, and innovation, Applicant has solved problems related to identifying and/or gaining more information about a failure in the system by developing solutions embodied in the present disclosure, which are described in detail below.

BRIEF SUMMARY

Various embodiments described herein relate to methods, apparatuses, and systems for fault diagnosis in an RFID system.

Various embodiments of the present disclosure provide a frequency identification (RFID) system comprising a first antenna comprising a radio frequency (RF) switch of the first antenna configured to receive a switch RF signal of the first antenna; and switch the switch RF signal of the first antenna to a radiating element of the first antenna or to an output of the first antenna; an integrated circuit (IC) tag of the first antenna configured to control the RF switch of the first antenna; and an RF fault bypass circuit of the first antenna configured to increase a power of an RF input signal to the IC tag of the first antenna when a bias voltage of the first antenna falls below a bias voltage threshold; and an RFID reading circuitry configured to: provide an RF signal of the first antenna and the bias voltage of the first antenna; and determines whether a fault in the RFID system exists using any of the bias voltage of the first antenna, a power level indicator of the RF signal of the first antenna, and the increase in the power of the RF input signal to the IC tag of the first antenna.

In various embodiments, the RFID system comprising one or more remote tags corresponding to the first antenna each configured to, when the RF switch of the first antenna switches the switch RF signal of the first antenna to the radiating element of the first antenna: receive a radiation from the radiating element of the first antenna; and emit a return radiation to the radiating element of the first antenna, wherein the RFID reading circuitry is configured to identify each of the one or more remote tags corresponding to the first antenna or indicate a presence of each of the one or more remote tags corresponding to the first antenna, using the return radiation from the corresponding each of the one or more remote tags corresponding to the first antenna.

In various embodiments, the RFID system comprising: a first attenuating coupler of the first antenna configured to attenuate the RF signal of the first antenna to generate a first attenuated RF signal of the first antenna and a first step reduced RF signal of the first antenna; an RF power detector of the first antenna configured to receive the first attenuated RF signal of the first antenna and generate the power level indicator of the RF signal of the first antenna; an RF power comparator of the first antenna configured to: compare the power level indicator of the RF signal of the first antenna with an RF signal power threshold; and generate a first input to the IC tag of the first antenna using the comparison of the power level indicator of the RF signal of the first antenna and the RF signal power threshold; and an RF signal loss visual indicator of the first antenna configured to: receive the first input to the IC tag of the first antenna; and visually indicate whether the power level indicator of the RF signal of the first antenna is less than the RF signal power threshold.

In various embodiments, the RFID system comprising: a bias voltage comparator of the first antenna configured to: compare the bias voltage of the first antenna with the bias voltage threshold; generate a second input to the IC tag of the first antenna using the comparison of the bias voltage of the first antenna and the bias voltage threshold; and a bias voltage loss visual indicator of the first antenna configured to: receive the second input to the IC tag of the first antenna; and visually indicate whether the bias voltage of the first antenna is less than the bias voltage threshold.

In various embodiments, the RFID system comprising: a second attenuating coupler of the first antenna configured to attenuate the first step reduced RF signal of the first antenna to generate a second attenuated RF signal of the first antenna and a second step reduced RF signal of the first antenna; and an RF power combiner of the first antenna configured to combine an output signal of the RF fault bypass circuit of the first antenna with the second attenuated RF signal of the first antenna.

In various embodiments, the bias voltage of the first antenna is above the bias voltage threshold: the switch RF signal of the first antenna is approximately equal to the second step reduced RF signal of the first antenna; the output signal of the RF fault bypass circuit of the first antenna is approximately zero; and the IC tag of the first antenna operates in a semi-passive mode and emits a first return radiation from the IC tag of the first antenna.

In various embodiments, the bias voltage of the first antenna falls below the bias voltage threshold: the output signal of the RF fault bypass circuit of the first antenna is approximately equal to the second step reduced RF signal of the first antenna; and the IC tag of the first antenna operates in a passive mode and emits a second return radiation from the IC tag of the first antenna, wherein a power level of the second return radiation from the IC tag of the first antenna is greater than a power level of the first return radiation from the IC tag of the first antenna.

In various embodiments, the RFID system comprising a second antenna electronically coupled to the output of the first antenna, the second antenna comprising: an RF switch of the second antenna configured to: receive a switch RF signal of the second antenna; and switch the switch RF signal of the second antenna to a radiating element of the second antenna or to an output of the second antenna; an IC tag of the second antenna configured to control the RF switch of the second antenna; and an RF fault bypass circuit of the second antenna configured to increase a power of an RF input signal to the IC tag of the second antenna when a bias voltage of the second antenna falls below the bias voltage threshold, wherein the second antenna is configured to: receive an RF signal of the second antenna from the output of the first antenna when the RF switch of the first antenna switches the switch RF signal of the first antenna to the output of the first antenna;

and receive the bias voltage of the second antenna from the output of the first antenna.

In various embodiments, the RFID system comprising one or more remote tags corresponding to the second antenna each configured to, when the RF switch of the second antenna switches the switch RF signal of the second antenna to the radiating element of the second antenna: receive a radiation from the radiating element of the second antenna; and emit a return radiation to the radiating element of the second antenna, wherein the RFID reading circuitry is configured to identify each of the one or more remote tags corresponding to the second antenna or indicate a presence of the one or more remote tags corresponding to the second antenna, using the return radiation from the corresponding each of the one or more remote tags corresponding to the second antenna.

In various embodiments, the RFID system comprising a first attenuating coupler of the second antenna configured to attenuate the RF signal of the second antenna to generate a first attenuated RF signal of the second antenna and a first step reduced RF signal of the second antenna; an RF power detector of the second antenna configured to receive the first attenuated RF signal of the second antenna and generate a power level indicator of the RF signal of the second antenna; an RF power comparator of the second antenna configured to: compare the power level indicator of the RF signal of the second antenna with the RF signal power threshold; and generate a first input to the IC tag of the second antenna using the comparison of the power level indicator of the RF signal of the second antenna and the RF signal power threshold; and an RF signal loss visual indicator of the second antenna configured to: receive the first input to the IC tag of the second antenna; and visually indicate whether the power level indicator of the RF signal of the second antenna is less than the RF signal power threshold.

In various embodiments, the RFID system comprising a bias voltage comparator of the second antenna configured to: compare the bias voltage of the second antenna with the bias voltage threshold; generate a second input to the IC tag of the second antenna using the comparison of the bias voltage of the second antenna and the bias voltage threshold; and a bias voltage loss visual indicator of the second antenna configured to: receive the second input to the IC tag of the second antenna; and visually indicate whether the bias voltage of the second antenna is less than the bias voltage threshold.

In various embodiments, the RFID system comprising: a second attenuating coupler of the second antenna configured to attenuate the first step reduced RF signal of the second antenna to generate a second attenuated RF signal of the second antenna and a second step reduced RF signal of the second antenna; and an RF power combiner of the second antenna configured to combine an output signal of the RF fault bypass circuit of the second antenna with the second attenuated RF signal of the second antenna.

In various embodiments, the bias voltage of the second antenna is above the bias voltage threshold: the switch RF signal of the second antenna is approximately equal to the second step reduced RF signal of the second antenna; the output signal of the RF fault bypass circuit of the second antenna is approximately zero; and the IC tag of the second antenna operates in a semi-passive mode and emits a first return radiation from the IC tag of the second antenna.

In various embodiments, the bias voltage of the second antenna falls below the bias voltage threshold: the output signal of the RF fault bypass circuit of the second antenna is approximately equal to the second step reduced RF signal of the second antenna; and the IC tag of the second antenna operates in a passive mode and emits a second return radiation from the IC tag of the second antenna, wherein a power level of the second return radiation from the IC tag of the second antenna is greater than a power level of the first return radiation from the IC tag of the second antenna.

In various embodiments, the RFID reading circuitry is configured to, when not receiving the return radiation in response to the radiation from the radiating element of the second antenna or when not receiving the first return radiation from the IC tag of the second antenna: determine the fault in the RFID system comprises an RF signal failure in the first antenna if the power level indicator of the RF signal of the first antenna is less than the RF signal power threshold, using the first input to the IC tag of the first antenna; and determine the fault in the RFID system comprises a bias voltage failure in the first antenna if the bias voltage of the first antenna is less than the bias voltage threshold, using the second input to the IC tag of the first antenna.

In various embodiments, the RFID reading circuitry is configured to, when the power level indicator of the RF signal of the first antenna is equal to or greater than the RF signal power threshold and the bias voltage of the first antenna is equal to or greater than the bias voltage threshold: determine whether the RFID reading circuitry can communicate with the IC tag of the second antenna; and determine the fault in the RFID system comprises any of a fault in a connection between the first and second antenna and a fault in the RF switch of the first antenna, when the RFID reading circuitry cannot communicate with the IC tag of the second antenna.

In various embodiments, the RFID reading circuitry is configured to, when the RFID reading circuitry can communicate with the IC tag of the second antenna: determine whether the RFID reading circuitry receives the second return radiation from the IC tag of the second antenna; and determine the fault in the RFID system comprises a bias voltage failure in the second antenna when the RFID reading circuitry receives the second return radiation from the IC tag of the second antenna.

In various embodiments, the RFID reading circuitry is configured to, when the RFID reading circuitry receives the first return radiation from the IC tag of the second antenna determine the fault in the RFID system comprises an RF signal failure in the second antenna if the power level indicator of the RF signal of the second antenna is less than the RF signal power threshold, using the first input to the IC tag of the second antenna; and determine the fault in the RFID system comprises a fault in the radiating element of the second antenna, if the power level indicator of the RF signal of the second antenna is equal to or greater than the RF signal power threshold, using the first input to the IC tag of the second antenna.

Various embodiments of the present disclosure provide an RFID system comprising: a plurality of antennas, each antenna comprising: an RF power comparator configured to compare the power level indicator of the RF signal of the antenna with an RF signal power threshold; a bias voltage comparator configured to compare a bias voltage of the antenna with a bias voltage threshold; an RF fault bypass circuit configured to: function as an approximate open circuit when the bias voltage of the antenna is equal to or higher than the bias voltage threshold; function as an approximate short circuit when the bias voltage of the antenna is lower than the bias voltage threshold; an RFID reading circuitry configured to determine a fault in the RFID system using any of the RF power comparison, bias voltage comparison, and function of the RF fault bypass circuit.

Various embodiments of the present disclosure provide a method for determining a fault in an RFID system comprising: determining a failure by an antenna of an antenna chain of the RFID system in detecting a remote tag associated with the antenna; determining a prior antenna in the antenna chain as faulty if an RF signal loss or a bias voltage loss is occurred in the prior antenna; determining the antenna is faulty if there are no RF signal loss or bias voltage loss in the prior antenna, and if an RFID reading circuitry is not able to communicate with an integrated circuit (IC) tag of the antenna or the RFID reading circuitry detects a jump in a return signal power from the IC tag of the antenna; and determining, when the RFID reading circuitry communicates with the IC tag of the antenna and the RFID reading circuitry does not detect the jump in the return signal power from the IC tag of the antenna: the antenna is faulty if an RF signal loss or a bias voltage loss is occurred in the antenna; and a radiating element of the antenna is faulty if the RF signal loss or the bias voltage loss is not occurred in the antenna.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
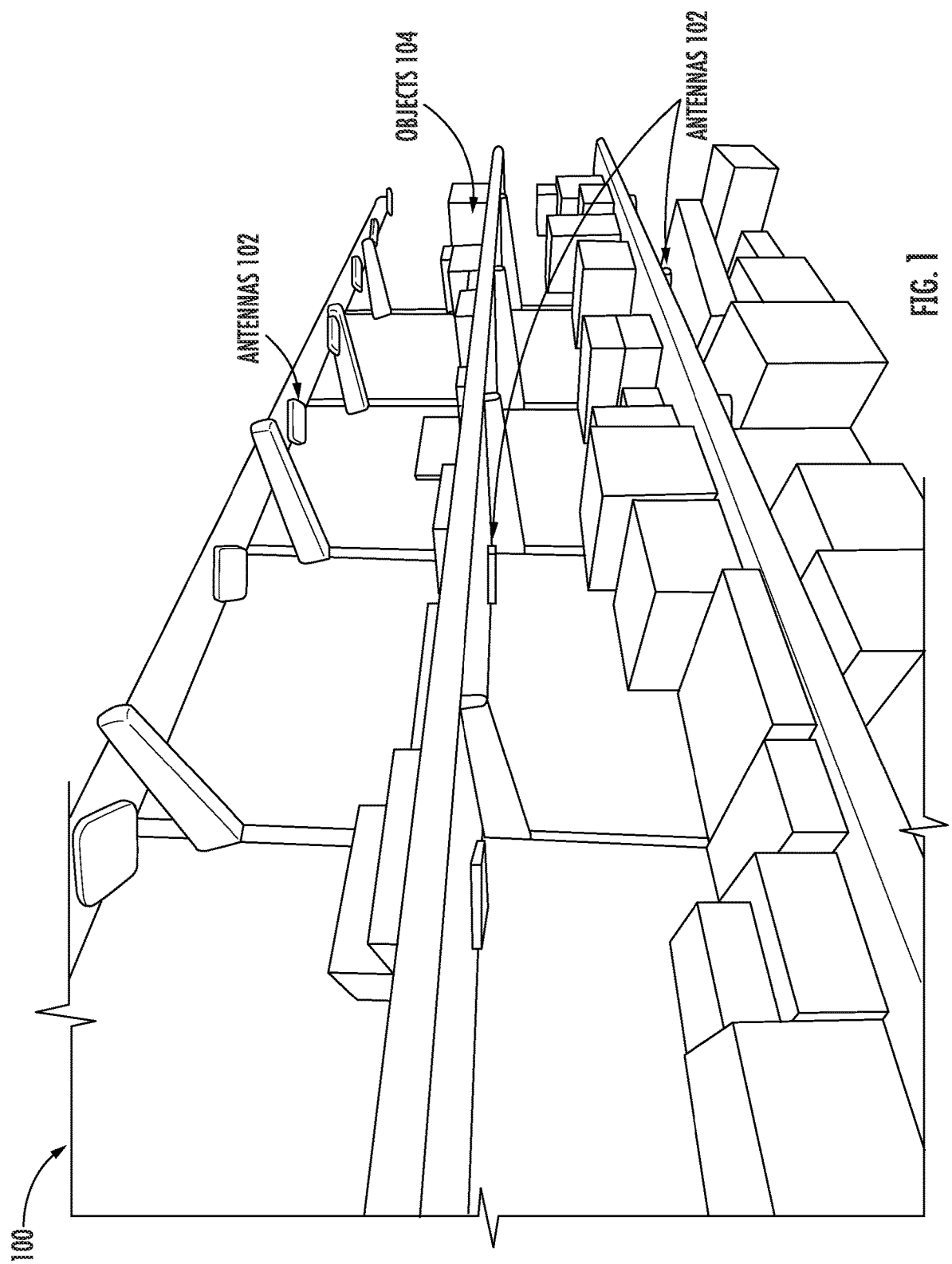
FIG. 1 illustrates an example schematic diagram depicting various components of an RFID system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may" "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refer to two or more electrical elements (for example, but not limited to, a controller, antennas, RFID reading circuitry, an example processing circuitry, communication module, input/output module, memory) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

In accordance with various embodiments of the present disclosure, RFID systems may be used to detecting, identify, account for, determine a presence of, and/or track objects such as objects in a warehouse, on a delivery truck, in an assembly line, on shelves in a store, etc. An RFID system may include one or more antennas for transmitting and/or receiving radio signals. For example, the radio signals may be in the frequency ranges of 600 MHz to 1.2 GHz, 700 MHz to 1.1 GHz, 800 MHz to 1 GHz, or preferably in the frequency range of 860 MHz to 960 MHz.

Referring now to FIG. 1, a schematic diagram illustrating various aspects of an RFID system 100 is presented in accordance with various embodiments of the present disclosure. In various embodiments, the RFID system 100 incudes one or more antennas 102. Each antenna may have a field of view for emitting and receiving radiation. The radiation may for example include any of radio signals, electromagnetic waves, microwave, photons, optical radiation, optical beams, etc.

One or more objects 104 may be placed in a field of view of each antenna. For example, the objects may be any of the items previously described such as boxes, packages, and/or other items on a delivery truck, in a warehouse, on shelves or otherwise placed in a store, restaurant, etc. In various examples, the objects 104 may be any include any object that may require tracking, detection, or determination of its presence. Each object may include a remote tag. In various embodiments, each remote tag communicates with a corresponding antenna.

The attentats 102 may be communicatively coupled to each other. For example, the antennas 102 are electronically coupled to each other. In some circumstances, one or more antennas may fail to communicate with its corresponding remote tags. It is desirable to detect the failure and/or determine a cause of the failure. Also, it is desirable to determine the location of the failure. Doing so may provide for faster or more efficient repair, replacement of components, and/or recovery in the RFID system.

Figure 2:
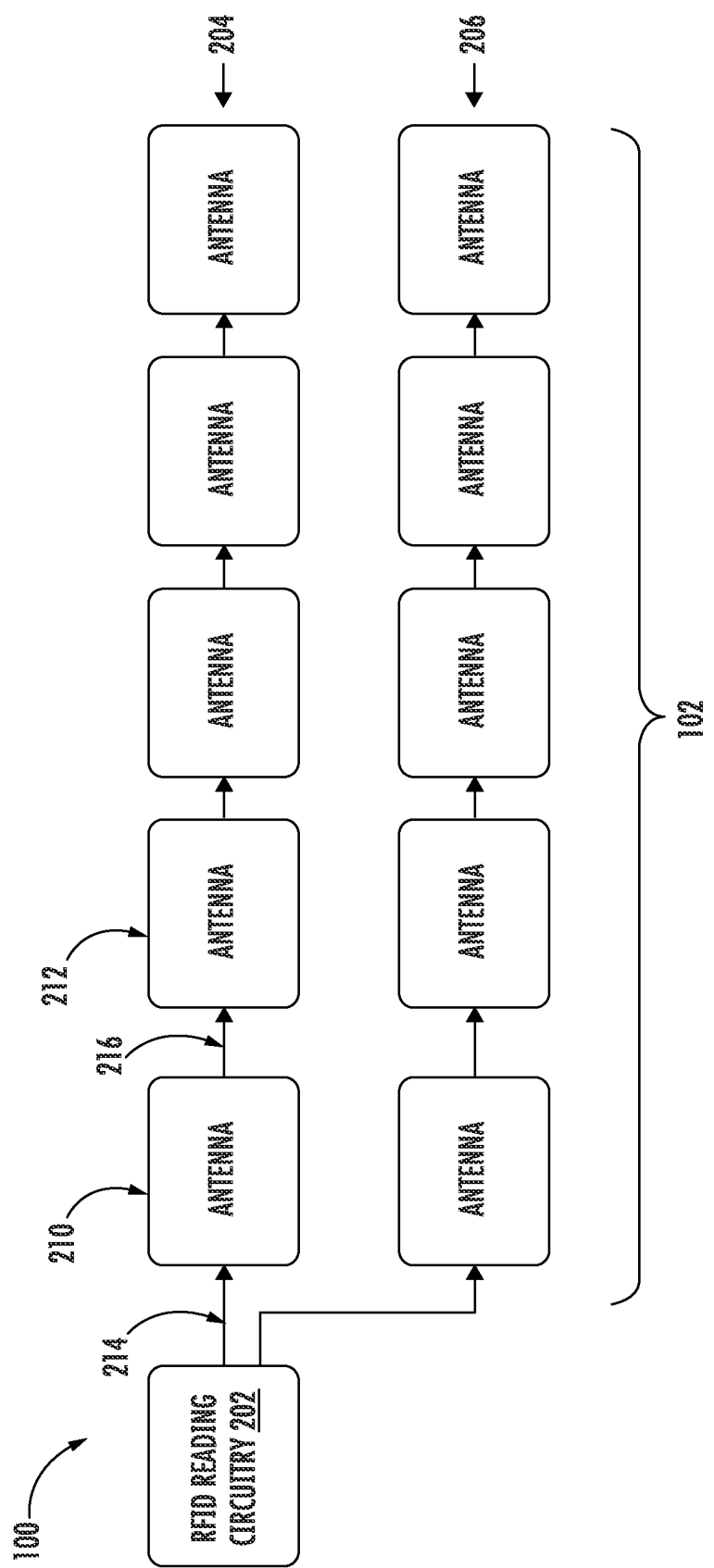
FIG. 2 illustrates an example schematic diagram depicting various components of an RFID system in accordance with various embodiments of the present disclosure.

Referring now to FIG. 2, a schematic diagram illustrating various aspects of the RFID system 100 is provided in accordance with various embodiments of the present disclosure. In various embodiments, the RFID system 100 includes an RFID reading circuitry 202. The RFID reading circuitry 202 may be electronically coupled to antennas 102 of the RFID system 100. The RFID system may provide an RF signal and a bias voltage to each of the antennas 102.

In various embodiments, the antennas 102 may be arranged in one or more chains of antennas, for example chains 204, 206. In various embodiments, more chains of antennas may be used. In various embodiments, in each chain of antennas one or more antennas are coupled in series. In various embodiments, the antennas in each chain of antennas are coupled in a daisy chain fashion. In example embodiments, the antennas may be coupled in a daisy chain fashion using any of the systems and methods described in U.S. Pat. No. 10,445,540 which is incorporated herein by reference in its entirety.

In various embodiments, the antennas on each chain are electronically coupled to each other or to the RFID reading circuitry 202, for example using coaxial cable, wires, conductive lines or connections, etc. For examples, a first antenna 210 and a second antenna 212 on the first chain 204 are coupled to each other using a cable 214.

In various embodiments, the RFID reading circuitry 202 is electronically coupled to the first antenna of each chain of antennas using a coaxial cable. For example, the RFID reading circuitry 202 is electronically coupled to the first antenna 210 using the coaxial cable 214. In various embodiments, the RFID reading circuitry 202 provides an RF signal of the first antenna and a bias voltage of the first antenna to the first antenna 210 on the coaxial cable 214.

Figure 3A:
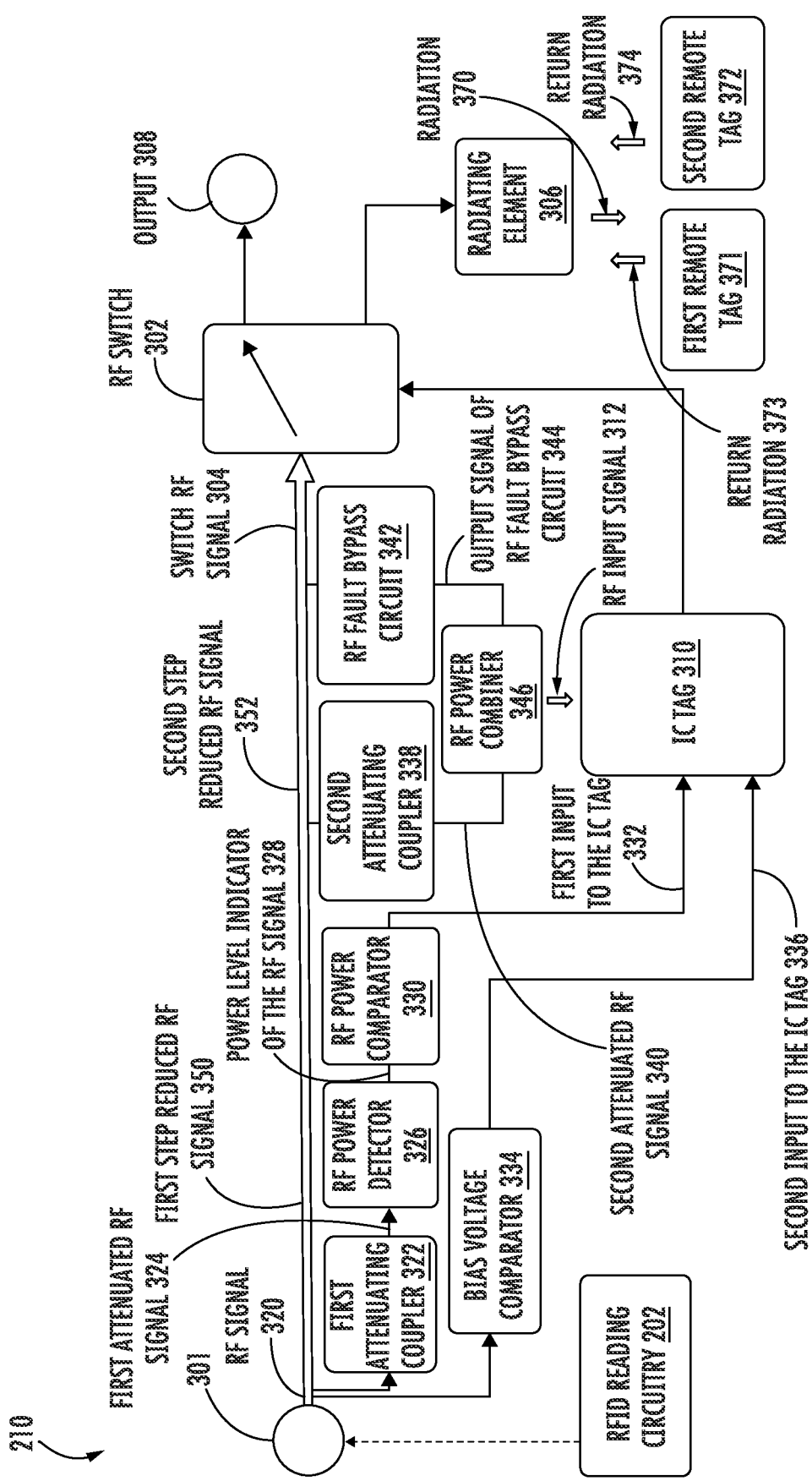
FIG. 3A illustrates an example schematic diagram depicting various components of an antenna of the RFID system in accordance with various embodiments of the present disclosure.
Figure 3B:
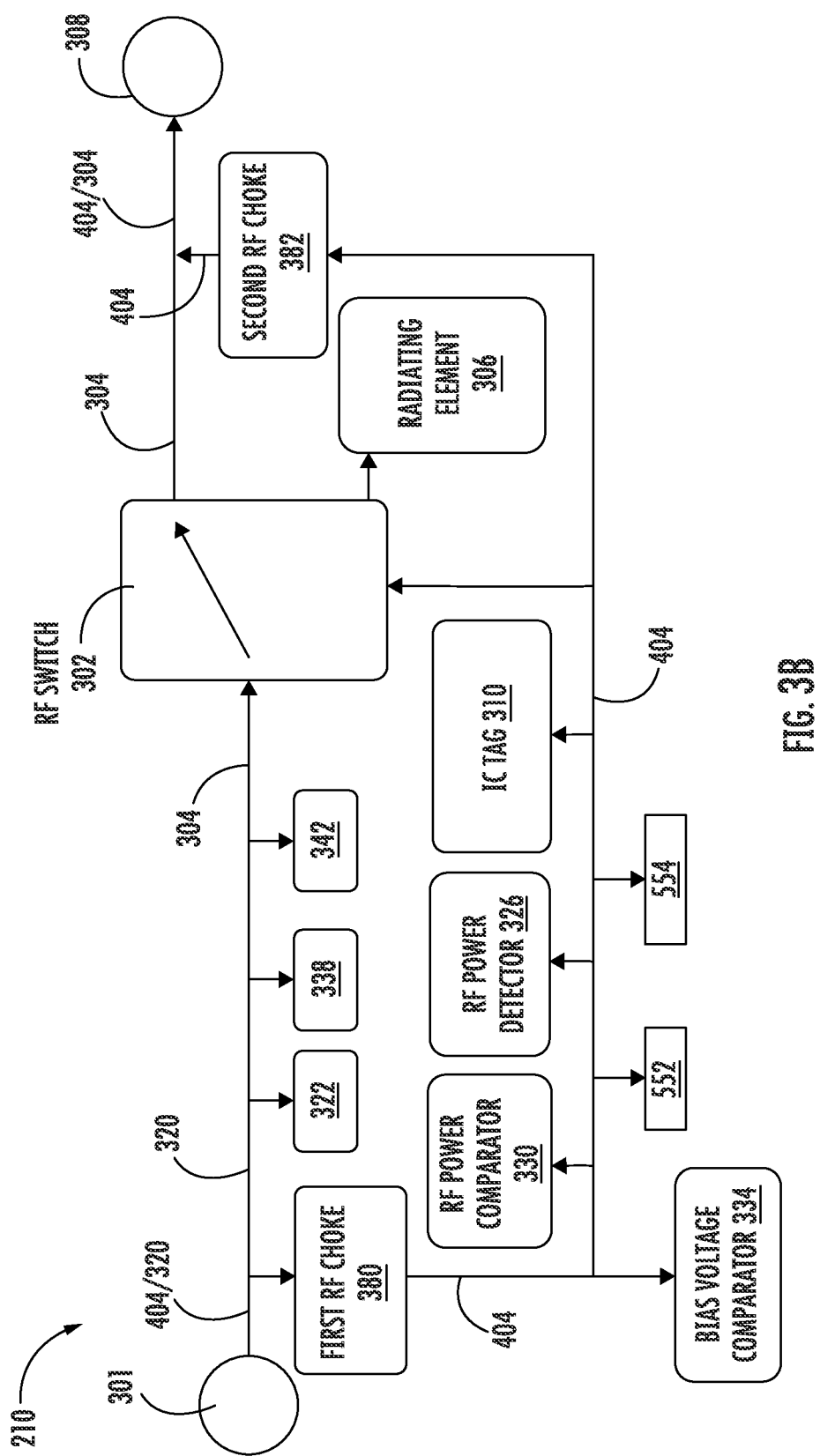
FIG. 3B illustrates an example schematic diagram depicting various components of an antenna of the RFID system in accordance with various embodiments of the present disclosure.
Figure 4:
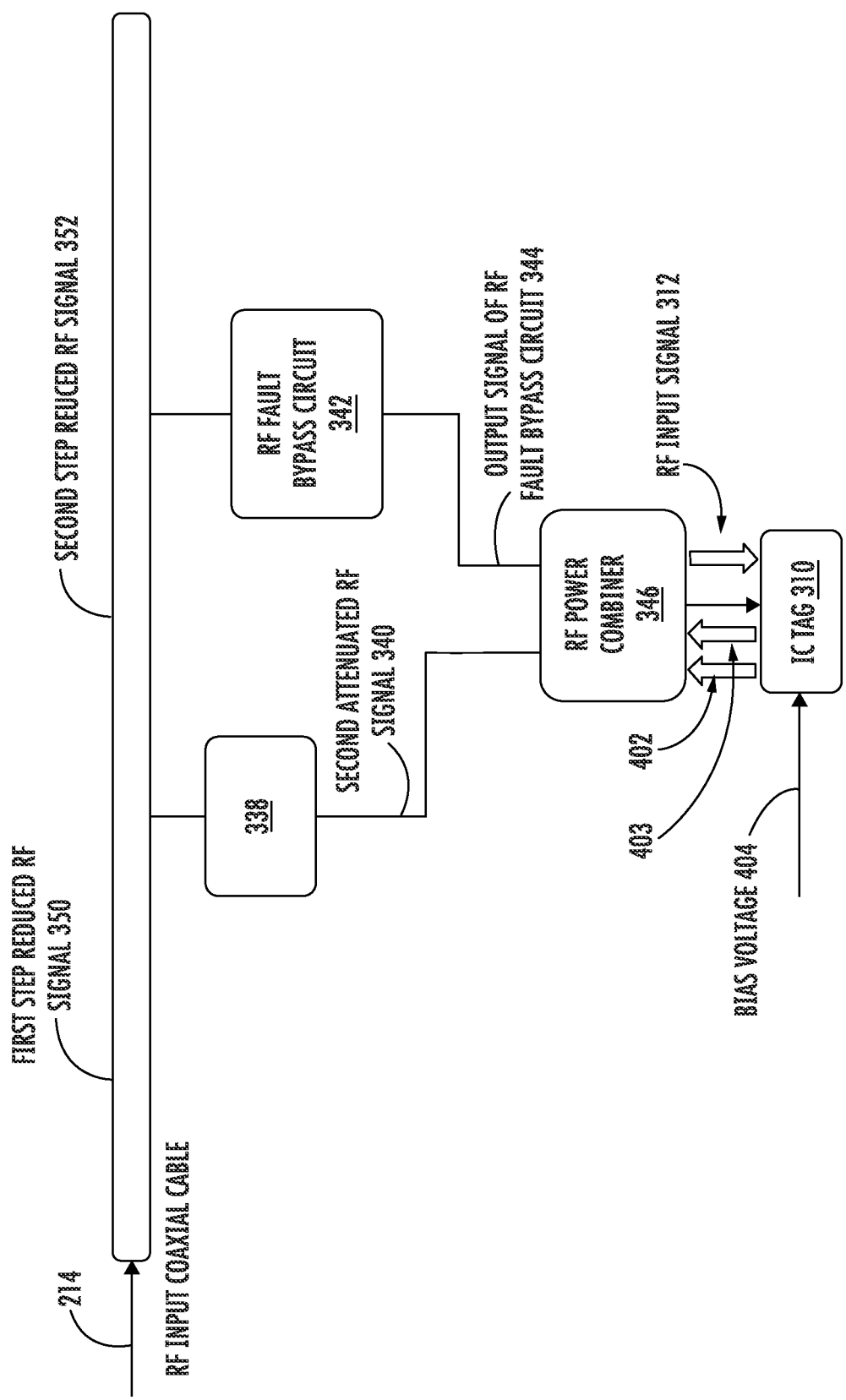
FIG. 4 illustrates an example schematic diagram depicting various components of an antenna of the RFID system in accordance with various embodiments of the present disclosure.
Figure 5:
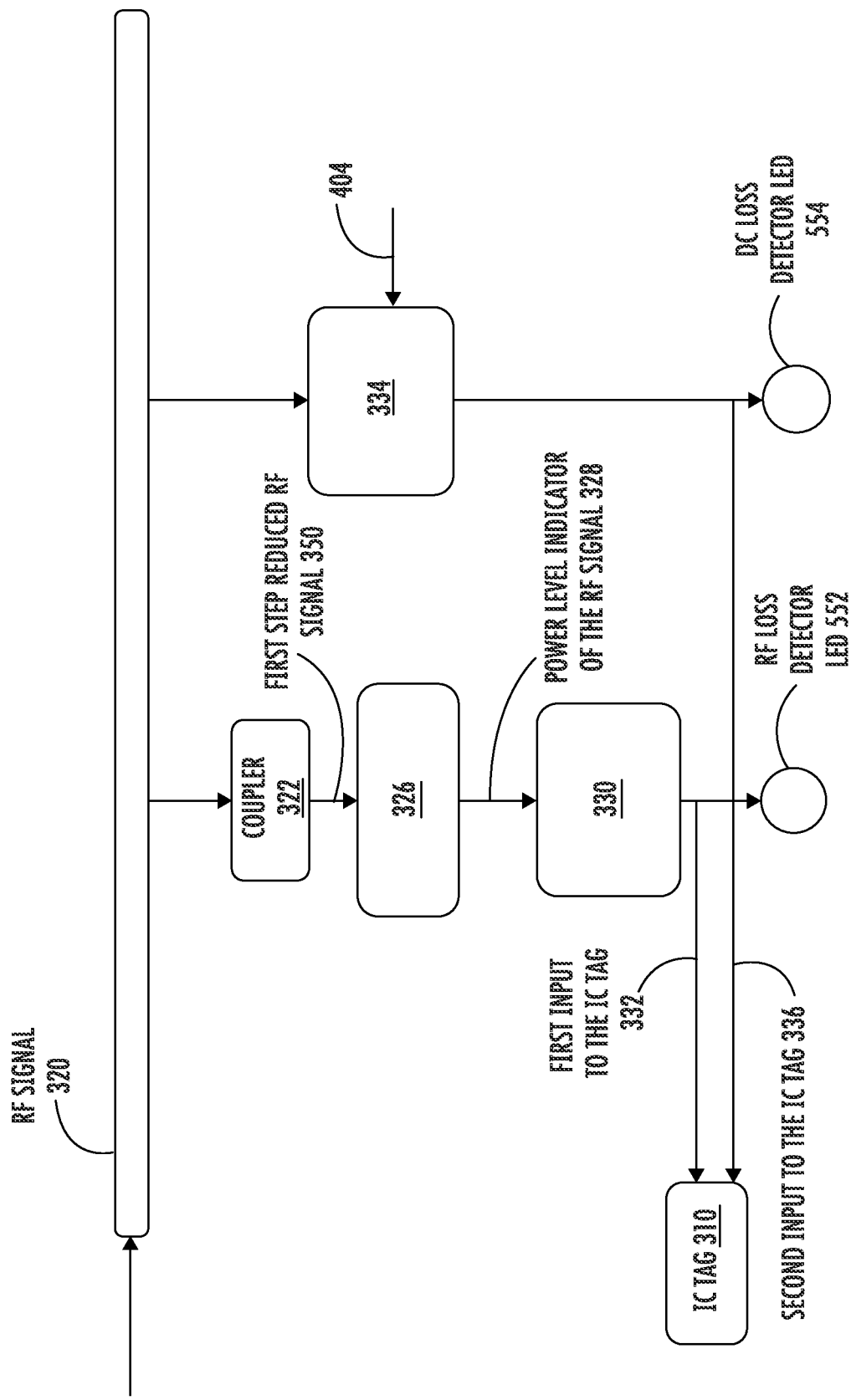
FIG. 5 illustrates an example schematic diagram depicting various components of an antenna of the RFID system in accordance with various embodiments of the present disclosure.

In various embodiments, the first antenna 210 provides an RF signal of the second antenna and a bias voltage of the second antenna to the second antenna 212 on the coaxial cable 216, using various systems and techniques provided herein, for example with respect to FIGS. 3-5. The first antenna 210 may provide the RF signal of the second antenna and the bias voltage of the second antenna to the second antenna 212 on the coaxial cable 216 using the RF signal of the first antenna and the bias voltage of the first antenna provided by the RFID reading circuitry 202.

Referring now to FIG. 3A, a schematic diagram illustrating various aspects of an antenna in an RFID system, for example the first antenna 210, is illustrated in accordance with various embodiments of the present disclosure. In various embodiments the first antenna 210 is part of an RFID system, for example the RFID system 100 with reference to FIG. 1, or any other RFID system(s) used for identification, detection, tracking, etc.

In various embodiments, with reference to FIG. 2, the RFID reading circuitry 202 is configured to provide an RF signal 320 of the first antenna over the coaxial cable 214 electronically coupled to the first antenna 210. In various embodiments, the first antenna 210 includes an input connector 301 configured to electronically couple to the cable 214. In various embodiments, the RFID reading circuitry 202 is configured to also provide a bias voltage of the first antenna over the coaxial cable 214 electronically coupled to the first antenna 210. In various embodiments, the bias voltage is used by various components of the antenna 210 to operate.

In various embodiments, the first antenna 210 includes a first attenuating coupler 322 of the first antenna configured to attenuate the RF signal 320 of the first antenna to generate a first attenuated RF signal 324 of the first antenna and a first step reduced RF signal 352 of the first antenna. In various embodiments, the first attenuated RF signal 324 of the first antenna is used to determine a power level of the RF signal of the first antenna. In example embodiments, using an attenuating coupler may allow for better conservation of the RF signal in the first antenna and in the chain of antennas as for example illustrated in FIG. 2. For example, by using a coupler with an attenuating level between 30-40 dB (for example 35 dB) as the first attenuating coupler 322 of the first antenna, the first step reduced RF signal 350 of the first antenna will not have much reduction in RF power compared to the RF signal 320 of the first antenna.

In various embodiments, an RF power detector 326 of the first antenna is configured to receive the first attenuated RF signal 324 of the first antenna and generate a power level indicator 328 of the RF signal of the first antenna. In various embodiments, the power level indicator may be any value derived from the RF signal indicating the power level of the RF signal. For example, the RF power detector 326 of the first antenna may determine a root mean square (RMS) value of the first attenuated RF signal 324 of the first antenna. In various embodiments, the RF power detector 326 of the first antenna may determine the power level indicator 328 of the RF signal of the first antenna taking into account the attenuation provided by the first attenuating coupler 322 of the first antenna. For example, the RF power detector 326 of the first antenna may scale up the detected RF power, proportional to the amount of the attenuation of the first attenuating coupler 322 of the first antenna, to determine the power level indicator 328 of the RF signal of the first antenna.

In various embodiments, the first antenna 210 includes an RF power comparator 330 of the first antenna. In various embodiments, the RF power comparator 330 of the first antenna is configured to compare the power level indicator 328 of the RF signal of the first antenna with an RF signal power threshold. In various embodiments, the RF signal power threshold is predetermined. In various embodiments, the RF signal power threshold is dynamic and/or variable. In various embodiments, the RF signal power threshold is selected to indicate the threshold below which the RF signal may not have enough power for communicating with one or more remote tags corresponding to the antenna.

In various embodiments, the RF power comparator 330 of the first antenna is configured to generate an RF power comparison output signal. In various embodiments, the output of the RF power comparator 330 of the first antenna from the comparison of the power level indicator 328 of the RF signal of the first antenna and the RF signal power threshold generates a first input 332 to an Integrated Circuit (IC) tag 310 of the first antenna. In various embodiments, the IC tag 310 of the first antenna performs various control and/or other functions in the first antenna as described herein.

In various embodiments, the antenna 210 includes a bias voltage comparator 334 of the first antenna. The bias voltage comparator 334 of the first antenna may be configured to compare the bias voltage of the first antenna with a bias voltage threshold. In various embodiments, the bias voltage threshold is predetermined. In various embodiments, the bias voltage threshold is dynamic and/or variable. In various embodiments, the bias voltage threshold is selected to indicate the threshold below which the various components of the antenna may not receive enough power to function. For example, the bias voltage is approximately 5 volts. In an example, the bias voltage threshold is between 3.5-4.5 volts. In an example the bias voltage threshold is 4 volts.

In various embodiments, the bias voltage comparator 334 of the first antenna is configured to generate a voltage comparison output signal. In various embodiments, the output of the bias voltage comparator 334 of the first antenna generates a second input to the IC tag of the first antenna using the comparison of the bias voltage of the first antenna and the bias voltage threshold.

In various embodiments, the first antenna 210 includes a second attenuating coupler 338 of the first antenna. The second attenuating coupler 338 of the first antenna may be configured to attenuate the first step reduced RF signal 350 of the first antenna to generate a second attenuated RF signal 340 of the first antenna and a second step reduced RF signal 352 of the first antenna.

In example embodiments, using the second attenuating coupler 338 of the first antenna may allow for better conservation of the RF signal in the first antenna and in the chain of antennas as for example illustrated in FIG. 2. For example, by using a coupler with an attenuating level between 30-40 dB (for example 35 dB) as the second attenuating coupler 338 of the first antenna, the second step reduced RF signal 352 of the first antenna will not have much reduction in RF power compared to the first step reduced RF signal 35 of the first antenna.

In various embodiments, the first antenna 210 includes an RF fault bypass circuit 342 of the first antenna. In various embodiments, when the bias voltage of the first antenna is greater than the bias voltage threshold, the RF fault bypass circuit 342 functions as an approximate open circuit. Accordingly, in various embodiments, when the bias voltage of the first antenna is above the bias voltage threshold, an output signal 344 of the RF fault bypass circuit of the first antenna is approximately zero.

In various embodiments, when the bias voltage of the first antenna is less than or equal to the bias voltage threshold, the RF fault bypass circuit 342 functions as an approximate short circuit. Accordingly, in various embodiments, when the bias voltage of the first antenna is less than or equal to the bias voltage threshold, the output signal 344 of the RF fault bypass circuit of the first antenna is approximately equal to the second step reduced RF signal 352 of the first antenna.

In various embodiments, the antenna 210 includes an RF power combiner 346 of the first antenna. In various embodiments, the RF power combiner 346 is configured to combine the output signal 344 of the RF fault bypass circuit of the first antenna with the second attenuated RF signal 340 of the first antenna. In various embodiments, an output of the power combiner 346 of the first antenna generates the RF input signal 312 to the IC tag 310 of the first antenna.

In various embodiments, the RF fault bypass circuit 342 of the first antenna, for example by using the techniques and methods previously described, is configured to increase a power of the RF input signal 312 to the IC tag 310 of the first antenna when a bias voltage of the first antenna falls below a bias voltage threshold.

In various embodiments, as previously described, when the when the bias voltage of the first antenna is above the bias voltage threshold, the output signal 344 of the RF fault bypass circuit of the first antenna is approximately zero. Therefore, in various embodiments, when the when the bias voltage of the first antenna is above the bias voltage threshold, the RF input signal 312 to the IC tag 310 of the first antenna is approximately equal to the second attenuated RF signal 340 of the first antenna. In various embodiments, as previously described, when the bias voltage of the first antenna is less than or equal to the bias voltage threshold, the RF input signal 312 to the IC tag 310 of the first antenna is approximately equal to the second attenuated RF signal 340 of the first antenna combined with the output signal 344 of the RF fault bypass circuit of the first antenna which under this condition is approximately equal to the second step reduced RF signal 352 of the first antenna. Hence, in various embodiments, when the bias voltage of the first antenna is equal to less than the bias voltage threshold, the power of the RF input signal 312 to the IC tag 310 of the first antenna is increased.

In various embodiments, the first antenna 210 includes the IC tag 310 of the first antenna. In various embodiments, the IC tag 310 of the first antenna may be configured to provide control and/or diagnosis function(s) in the first antenna 210. In various embodiments, the IC tag 310 may control an RF switch 302 of the first antenna. In various embodiments, the IC tag 310 provides diagnosis information to the RFID reading circuitry 202 with respect any of the RF signal and/or bias voltage failure(s) to the RFID reading circuitry 202 as for example described below.

In various embodiments, the first antenna 210 includes a radio frequency (RF) switch 302 of the first antenna. The RF switch 302 of the first antenna may be configured to receive a switch RF signal 304 of the first antenna. The RF switch 302 of the first antenna may switch the switch RF signal 304 of the first antenna to a radiating element 306 of the first antenna or to an output 308 of the first antenna. In various embodiments, the IC tag 310 may be configured to control whether the RF switch 302 of the first antenna switches the switch RF signal 304 of the first antenna to the output 308 of the first antenna or to the radiating element 306 of the first antenna.

In various embodiments, when the bias voltage of the first antenna 210 is above the bias voltage threshold, the RF fault bypass circuit 342 functions as an approximate open circuit and the switch RF signal 304 of the first antenna is approximately equal to the second step reduced RF signal 352 of the first antenna. Therefore, under a normal operating condition with respect to the bias voltage, when the first antenna 210 receives proper bias voltage (above the bias voltage threshold), the RF switch 302 of the first antenna receives most of the RF signal 320 of the first antenna (expect for the relatively small reductions in the RF signal power caused by the first and second attenuating couplers of the first antenna).

In various embodiments, under the normal operating condition of the first antenna 210 with respect to the bias voltage as described above, the RF switch 302 of the first antenna switches most of the RF signal 320 of the first antenna to the output 308 of the first antenna or to the radiating element 306 of the first antenna. In various embodiments, with reference to FIG. 2, the second antenna 212 is electronically coupled to the output 308 of the first antenna such that when RF switch 302 of the first antenna switches most of the RF signal 320 of the first antenna to the output 308, it is received by the second antenna 212 in the first chain of antennas 204.

In various embodiments, under the normal operating condition of the first antenna 210 with respect to the bias voltage, the RF switch 302 of the first antenna switches most of the RF signal 320 of the first antenna to the radiating element 306 of the first antenna to be radiated to a field of view of the first antenna 210, or the RF switch 302 of the first antenna switches most of the RF signal 320 of the first antenna to the output 308 of the first antenna which is coupled to the input of the second antenna 212. In various embodiments, the IC tag 310 of the first antenna controls the switching function of the RF switch 302 of the first antenna.

In example embodiments, when the RFID reading circuitry 202 requires the first antenna 210 to emit and receive radiations to its field of view, the RFID reading circuitry 202 may direct the IC tag 310 of the first antenna to control the RF switch 302 of the first antenna to switch the switch RF signal 304 of the first antenna to the radiating element 306 of the first antenna. In example embodiments, when the RFID reading circuitry 202 requires the second antenna 212 or any following antenna in the first chain of antennas 204 to emit and receive radiations to its field of view, the RFID reading circuitry 202 may direct the IC tag 310 of the first antenna to control the RF switch 302 of the first antenna to switch the switch RF signal 304 of the first antenna to the second antenna 212 via the output 308 of the first antenna.

In various embodiments, with reference to FIG. 2, the RFID system 100 includes one or more remote tags. In various embodiments, each antenna of the one or more antennas of the RFID system 100 may correspond to one or more remote tags. For example, the first antenna 210 may correspond with one or more remote tags.

In various embodiments, each remote tag corresponding to the first antenna 210 is configured to, when the RF switch 302 of the first antenna switches the switch RF signal of the first antenna to the radiating element of the first antenna, receive a radiation from the radiating element of the first antenna and emit a return radiation to the radiating element of the first antenna. For example, the first remote tag 371 and the second remote tag 372 may correspond to the first antenna 210. In various embodiments, the first remote tag 371 and the second remote tag 372 receive a radiation 370 from the radiating element 306 of the first antenna. The first remote tag 371 may emit a return radiation 373 corresponding to the first remote tag and the second remote tag 372 may emit a return radiation 374 corresponding to the second remote tag to the radiating element 306. In various embodiments, using the return radiation(s), the antenna 210 identifies, determines a presence of, or otherwise detects any remote tag(s) corresponding to the first antenna. In various embodiments, each of the tag(s) may be attached to, placed in, or otherwise uniquely associated with an object in a field of view of the radiating element of the antenna. Using the remote tags, the antenna may identify, determine a presence of, or otherwise detect any object(s) in its field of view.

In various embodiment, the RFID reading circuitry 202 is configured to identify and/or detect each of the one or more remote tags corresponding to the first antenna 210 and/or indicate a presence of each of the one or more remote tags corresponding to the first antenna, using the return radiation from the corresponding each of the one or more remote tags corresponding to the first antenna. In various embodiments, each of the remote tags may be attached to, located in, or otherwise associated with an object, hence identifying, indicating a presence of, and/or detecting each tag may correspond to that of the associated object.

Referring now to FIG. 3B, a schematic diagram illustrating various aspects of an antenna in an RFID system, for example the first antenna 210, is illustrated in accordance with various embodiments of the present disclosure. In various embodiments, the RFID reading circuitry 202 is electronically coupled to the input port 301 to provide the RF signal 320 of the first antenna and the bias voltage 404 of the first antenna.

In various embodiments, the first antenna 210 includes a first RF choke circuitry 380. In various embodiments, the first RF choke circuitry 380 is configured to separate the RF signal 320 of the first antenna from the bias voltage 404 of the first antenna. In various embodiments, the bias voltage 404 of the first antenna is provided to various components of the first antenna 210 that require a bias voltage to operate, such as the RF power comparator 330 of the first antenna, the RF power detector 326 of the first antenna, the IC tag 310 of the first antenna, the bias voltage comparator 334 of the first antenna, the RF switch 302 of the first antenna, an RF signal loss visual indicator 552, and a bias voltage loss visual indicator 554 (as described below), etc.

In various embodiments, the first RF choke circuitry 380 prevents the RF signal from reaching the bias voltage input of various components of the antenna 210 and prevents the bias voltage from reaching RF inputs of various components such as the first attenuating coupler 322 of the first antenna, the second attenuating coupler 338 of the first antenna, the RF fault bypass circuit 342 of the first antenna, the RF switch 302 of the first antenna etc. In example embodiments, the first RF choke circuitry may be a signal splitter.

In various embodiments, the first antenna 210 includes a second RF choke circuitry 382. In various embodiments, the second RF choke circuitry 382 is configured to add the bias voltage back on a main RF cable of the first antenna such that a combination of both bias voltage and an RF signal is provided to the second antenna. For example, the second RF choke circuitry 382 adds the bias voltage 404 of the first antenna to the switch RF signal 304 of the first antenna and a combination of the bias voltage and the RF signal is provided to the output 308 of the first antenna and to an input of the second antenna. In example embodiments, the second RF choke circuitry may be a signal combiner.

Referring now to FIG. 4, a schematic diagram illustrating various aspects of some of the components of the first antenna is provided in accordance with various embodiments of the present disclosure.

In various embodiments, when the bias voltage 404 of the first antenna 210 is above the bias voltage threshold, the IC tag 310 of the first antenna operates in a semi-passive mode and emits a first return radiation 402 from the IC tag of the first antenna with a low power. In various embodiments, the semi-passive mode is the normal operation mode for the IC tag 310 of the first antenna. In the semi-passive mode, the IC tag 310 of the first antenna has high sensitivity and can function with a low power of the RF input signal 312 to the IC tag 310 of the first antenna.

In various embodiments, under the normal operating condition of the first antenna 210 with respect to the bias voltage as described above, the output signal 344 of the RF fault bypass circuit of the first antenna is approximately zero. Therefore, under the normal operating condition of the first antenna 210 with respect to the bias voltage, the IC tag 310 of the first antenna receives a low power input approximately equal to the second attenuated RF signal 340 of the first antenna. Therefore, in various embodiments, the first return radiation from the IC tag of the first antenna is relatively low under such conditions. In various embodiments, the RFID reading circuitry 202 is configured to detect the first return radiation from the IC tag of the first antenna after it passes through the second attenuating coupler 338 again (and may be further attenuated) and is transmitted over the coaxial cable to the RFID reading circuitry 202.

In various embodiments, when the bias voltage 404 of the first antenna 210 is below or equal to the bias voltage threshold, the IC tag 310 of the first antenna operates in a passive mode and emits a second return radiation 403 from the IC tag of the first antenna with a high power. In various embodiments, the power level of the second return radiation 403 from the IC tag of the first antenna is greater than the power level of the first return radiation 402 from the IC tag of the first antenna. In the passive mode, the IC tag 310 of the first antenna has low sensitivity and requires a high power of the RF input signal 312 to the IC tag 310 of the first antenna to operate.

In various embodiments, under a failure condition for the bias voltage of the first antenna, for example when the bias voltage of the first antenna is equal to or below the bias voltage threshold, the output signal 344 of the RF fault bypass circuit of the first antenna is approximately equal to the second step reduced RF signal 352 of the first antenna. Therefore, under a fault condition of the first antenna 210 with respect to the bias voltage, the IC tag 310 of the first antenna receives a high-power input close to the power of the RF signal 320 of the first antenna. Therefore, in various embodiments, the first return radiation from the IC tag of the first antenna is relatively high under such conditions. In various embodiments, the RFID reading circuitry 202 is configured to detect the first return radiation from the IC tag of the first antenna after a portion of it passes through the second attenuating coupler 338 again (and may be further attenuated) and a portion of it passes through the RF fault bypass circuit 342 (approximately without any attenuation) and is transmitted over the coaxial cable to the RFID reading circuitry 202.

In various embodiments, the RFID reading circuitry 202 is configured to determine whether a fault in the RFID system exists using any of the bias voltage of the first antenna, a power level indicator of the RF signal of the first antenna, and the increase in the power of the RF input signal to the IC tag of the first antenna. In various embodiments, the RFID circuitry 202 determines the increase in the power of the RF input signal to the IC tag of the first antenna using the received first return radiation 402 or second return radiation 403 from the IC tag of the first antenna. In various embodiments, the RFID reading circuitry 202 may determine a change in the bias voltage of the first antenna or the power level indicator of the RF signal of the first antenna by querying the IC tag 310 and/or determining the values of the first input 332 or the second input 336 to the IC tag of the first antenna.

In an example embodiment, for the first antenna, a power of the first step reduced RF signal 350 may be approximately 20 dBm, a power of the second attenuated RF signal 340 may be approximately −15 dBm (assuming the second attenuating coupler 338 of the first antenna is a 35 dBm coupler), the power of the first return radiation 402 in a semi-passive mode of the IC tag may be approximately −25 dBm and the power of the second return radiation 403 in the passive mode of the IC tag may be approximately 10 dBm. In example embodiments, the values may be lower for the other antennas due to signal loss in cables and/or RF switches. For example, at each stage of antennas the signal powers may be reduced by about 2 dBm. It is noted however, that these values are for example and illustration purposes and the signals may be any other power values in accordance with various embodiments of the present disclosure.

Referring now to FIG. 5, a schematic diagram illustrating various aspects of a failure detection system is presented in accordance with various embodiments of the present disclosure. In various embodiments, visual indicators are used to indicate a failure in the RF signal 320 of the first antenna or the bias voltage of the first antenna. In various embodiments, the first antenna 210 is electronically coupled to an RF signal loss visual indicator 552 of the first antenna. In various embodiments, the first antenna 210 is electronically coupled to a bias voltage loss visual indicator 554 of the first antenna. In example embodiments, the RF signal loss visual indicator 552 of the first antenna includes a light emitting diode (LED). In example embodiments, bias voltage loss visual indicator 554 of the first antenna includes a light emitting diode (LED).

In various embodiments, the RF signal loss visual indicator 552 of the first antenna is electronically coupled to the first input 332 to the IC tag of the first antenna. In various embodiments, the RF signal loss visual indicator 552 of the first antenna receive the first input to the IC tag of the first antenna and visually indicates whether the power level indicator of the RF signal of the first antenna is less than the RF signal power threshold.

In various embodiments, the bias voltage loss visual indicator 554 of the first antenna is electronically coupled to the second input 336 to the IC tag of the first antenna. In various embodiments, the bias voltage loss visual indicator 554 of the first antenna receive the second input to the IC tag of the first antenna and visually indicate whether the bias voltage of the first antenna is less than the bias voltage threshold.

In various embodiments, using the visual indicators, loss of RF signal or bias voltage may be visually displayed at or in proximity of each antenna. Additionally and/or alternatively, the status of the RF signal and bias voltage of the first antenna may be communicated back to the RFID reading circuitry 202. In various embodiments, the RFID reading circuitry determines the status of the RF signal and bias voltage of the first antenna by querying the IC tag 310 of the first antenna and reading the values of the first and second inputs to the IC tag of the first antenna. In various embodiments, the RFID system 100 may include a dashboard including one or more visual indicators and/or a display for displaying the status of the RF signal and bias voltage for any of the antennas of the RFID system 100.

In various embodiments, the second antenna 212 is electronically coupled to the output 308 of the first antenna 210. In various embodiments, a coaxial cable input of the second antenna 210 is electronically coupled to the output 308 of the first antenna. In various embodiments, the second antenna 212 may include components and/or perform functions similar to those of antenna 210 as described above.

In various embodiments, the second antenna 212 includes an RF switch of the second antenna. In various embodiments, the RF switch of the second antenna is configured to receive a switch RF signal of the second antenna, and switch the switch RF signal of the second antenna to a radiating element of the second antenna or to an output of the second antenna. In various embodiments, the second antenna includes an IC tag of the second antenna. In various embodiments, the IC tag of the second antenna is configured to control the RF switch of the second antenna.

In various embodiments, the second antenna includes an RF fault bypass circuit of the second antenna. In various embodiments, the RF fault bypass circuit of the second antenna is configured to increase a power of an RF input signal to the IC tag of the second antenna when a bias voltage of the second antenna falls below the bias voltage threshold.

In various embodiments, the second antenna is configured to receive an RF signal of the second antenna from the output of the first antenna when the RF switch of the first antenna switches the switch RF signal of the first antenna to the output of the first antenna. In various embodiments, the second antenna is configured to receive the bias voltage of the second antenna from the output of the first antenna. In various embodiments, the RF signal of the second antenna and the bias voltage of the second antenna is transmitted to the second antenna via the coaxial cable 216. In various embodiments, the second antenna is configured to receive the RF signal of the second antenna and the bias voltage of the second antenna using a coaxial cable input to the second antenna.

In various embodiments, the RFID system 100 includes one or more remote tags corresponding to the second antenna each configured to, when the RF switch of the second antenna switches the switch RF signal of the second antenna to the radiating element of the second antenna, receive a radiation from the radiating element of the second antenna and emit a return radiation to the radiating element of the second antenna.

In various embodiments, the RFID reading circuitry 202 is configured to identify each of the one or more remote tags corresponding to the second antenna or indicate a presence of the one or more remote tags corresponding to the second antenna, using the return radiation from the corresponding each of the one or more remote tags corresponding to the second antenna.

In various embodiments, the second antenna 212 includes a first attenuating coupler of the second antenna configured to attenuate the RF signal of the second antenna to generate a first attenuated RF signal of the second antenna and a first step reduced RF signal of the second antenna.

In various embodiments the second antenna 212 includes an RF power detector of the second antenna configured to receive the first attenuated RF signal of the second antenna and generate a power level indicator of the RF signal of the second antenna.

In various embodiments, the second antenna 212 includes an RF power comparator of the second antenna. In various embodiments, the RF power comparator of the second antenna is configured to compare the power level indicator of the RF signal of the second antenna with the RF signal power threshold and generate a first input to the IC tag of the second antenna using the comparison of the power level indicator of the RF signal of the second antenna and the RF signal power threshold.

In various embodiments, the second antenna 212 includes an RF signal loss visual indicator of the second antenna. For example, the RF signal loss visual indicator of the second antenna may be an LED. In various embodiments, the RF signal loss visual indicator of the second antenna is configured to receive the first input to the IC tag of the second antenna, and visually indicate whether the power level indicator of the RF signal of the second antenna is less than the RF signal power threshold. For example, the LED used as the RF signal loss visual indicator of the second antenna turns on when the power level indicator of the RF signal of the second antenna is less than the RF signal power threshold, or vice versa.

In various embodiments, the second antenna 212 includes a bias voltage comparator of the second antenna. In various embodiments, the bias voltage comparator of the second antenna is configured to compare the bias voltage of the second antenna with the bias voltage threshold. In various embodiments, the bias voltage comparator of the second antenna is configured to generate a second input to the IC tag of the second antenna using the comparison of the bias voltage of the second antenna and the bias voltage threshold.

In various embodiments, the second antenna 212 includes a bias voltage loss visual indicator of the second antenna. For example, the bias voltage visual indicator of the second antenna may be an LED. In various embodiments, the bias voltage visual indicator of the second antenna is configured to receive the second input to the IC tag of the second antenna and visually indicate whether the bias voltage of the second antenna is less than the bias voltage threshold. For example, the LED used as the bias voltage loss visual indicator of the second antenna turns on when the bias voltage indicator of the bias voltage of the second antenna is less than the bias voltage threshold, or vice versa.

In various embodiments, the second antenna 212 includes a second attenuating coupler of the second antenna. In various embodiments, the second attenuating coupler of the second antenna is configured to attenuate the first step reduced RF signal of the second antenna to generate a second attenuated RF signal of the second antenna at an output of the second attenuating coupler of the second antenna, and a second step reduced RF signal of the second antenna, for example on a coaxial cable of the first antenna.

In various embodiments, the second antenna 212 includes an RF power combiner of the second antenna. In various embodiments, the RF power combiner of the second antenna is configured to combine an output signal of the RF fault bypass circuit of the second antenna with the second attenuated RF signal of the second antenna to generate an RF input signal to the IC tag of the second antenna.

In various embodiments, when the bias voltage of the second antenna is above the bias voltage threshold, the output signal of the RF fault bypass circuit of the second antenna is approximately zero and the switch RF signal of the second antenna is approximately equal to the second step reduced RF signal of the second antenna. In various embodiments, when the bias voltage of the second antenna is above the bias voltage threshold, the IC tag of the second antenna operates in a semi-passive mode and emits a first return radiation from the IC tag of the second antenna. In various embodiments, the IC tag of the second antenna is configured to operate in a semi-passive mode when the bias voltage provided to it is above the bias voltage threshold. In various embodiments, the RFID reading circuitry 202 detects the first return radiation from the IC tag of the second antenna and determines a power level of it. In various embodiments, the power level of the first return radiation from the IC tag of the second antenna is less than a power level of a second return radiation from the IC tag of the second antenna when the IC tag of the second antenna operates in a passive mode.

In various embodiments, when the bias voltage of the second antenna falls below the bias voltage threshold, the output signal of the RF fault bypass circuit of the second antenna is approximately equal to the second step reduced RF signal of the second antenna. In various embodiments, when the bias voltage of the second antenna falls below the bias voltage threshold the IC tag of the second antenna is configured to operate in the passive mode. Therefore, in various embodiments, when the bias voltage of the second antenna falls below the bias voltage threshold and the IC tag of the second antenna operates in the passive mode, it emits a second return radiation from the IC tag of the second antenna. In various embodiments, a power level of the second return radiation from the IC tag of the second antenna is greater than a power level of the first return radiation from the IC tag of the second antenna. In various embodiments, the RFID reading circuitry received the first and second return radiations from the IC tag of the second antenna and determines the corresponding power levels.

Figure 6:
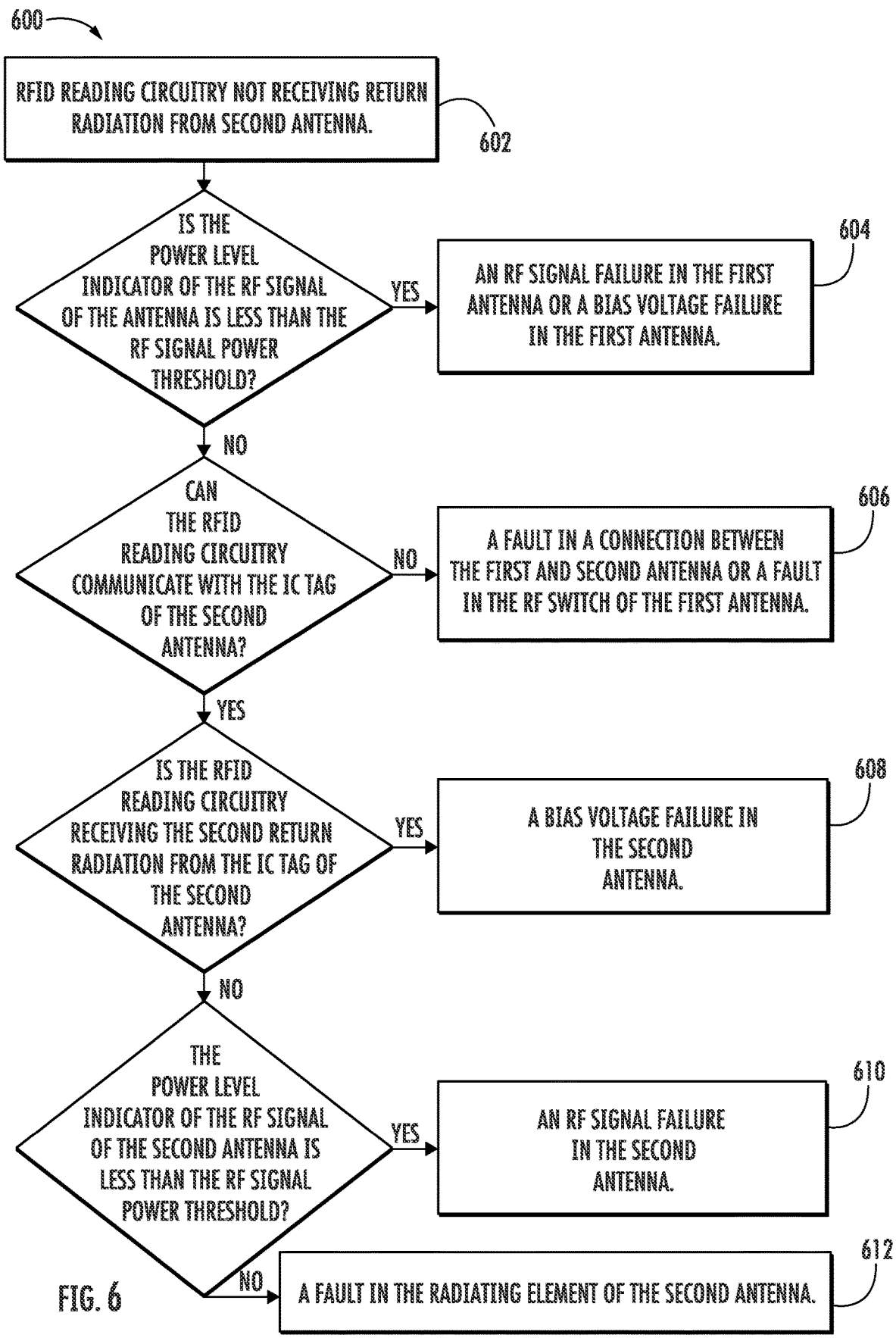
FIG. 6 is a flowchart diagram illustrating example operations in accordance with various embodiments of the present disclosure.

Referring now to FIG. 6, a flowchart illustrating a method 600 is illustrated in accordance with various embodiments of the present disclosure. In various embodiments, at step 602, if the RFID reading circuitry 202 does not receive the return radiation in response to the radiation from the radiating element of the second antenna or when the RFID reading circuitry 202 does not receive the first return radiation from the IC tag of the second antenna, the RFID reading circuitry 202 determines that the second antenna position is faulty and/or a fault exists in the RFID system 100.

In various embodiments, at step 604, the RFID reading circuitry 202 determines that the fault in the RFID system includes and/or is an RF signal failure in the first antenna if the power level indicator of the RF signal of the first antenna is less than the RF signal power threshold. In various embodiments, the RFID reading circuitry 202 determines that the RF signal of the first antenna is less than the RF signal power threshold using the first input 332 to the IC tag of the first antenna. In various embodiments, the RFID reading circuitry 202 may determine the first input to the IC tag of the first antenna by querying the IC tag 310 of the first antenna. In various embodiments, the RF signal loss visual indicator of the first antenna may be additionally and/or instead be checked for determining that the RF signal of the first antenna is less than the RF signal power threshold.

In various embodiments, at step 604 the RFID reading circuitry 202 determines that the fault in the RFID system includes and/or is a bias voltage failure in the first antenna if the bias voltage of the first antenna is less than the bias voltage threshold. In various embodiments, the RFID reading circuitry 202 determines that the bias voltage of the first antenna is less than the bias voltage threshold using the second input 336 to the IC tag of the first antenna. In various embodiments, the RFID reading circuitry 202 may determine the second input to the IC tag of the first antenna by querying the IC tag 310 of the first antenna. In various embodiments, the bias voltage loss visual indicator of the first antenna may be additionally and/or instead be checked for determining that the bias voltage of the first antenna is less than the bias voltage threshold.

In various embodiments, when the power level indicator of the RF signal of the first antenna is equal to or greater than the RF signal power threshold and the bias voltage of the first antenna is equal to or greater than the bias voltage threshold, the RFID reading circuitry 202 determines whether it can communicate with the IC tag of the second antenna.

In various embodiments, when the RFID reading circuitry cannot communicate with the IC tag of the second antenna, at step 606, the RFID reading circuitry determines that the fault in the RFID system includes and/or is any of a fault in a connection between the first and second antenna (for example the cable 216 and/or a connection between the output 308 of the first antenna and the cable 216) and/or a fault in the RF switch of the first antenna. For example, the RF switch of the first antenna may not be switching the switch RF signal 304 of the first antenna to the output 308 of the first antenna. In various embodiments, the output 308 of the first antenna may be faulty and/or not be receiving an output from the RF signal 304 of the first antenna.

In various embodiments, when the RFID reading circuitry can communicate with the IC tag of the second antenna, the RFID reading circuitry determines whether it receives the second return radiation from the IC tag of the second antenna. In various embodiments, the second return radiation from the IC tag of the second antenna has a higher power value than the first return radiation from the IC tag of the second antenna. For example, the second return radiation from the IC tag of the second antenna has about 5-15 dB, for example about 10 dB, higher power value than the first return radiation from the IC tag of the second antenna. In various embodiments, the RFID reading circuitry determines whether it receives the second return radiation from the IC tag of the second antenna by determining whether there is a jump in the power of the return radiation from the IC tag of the second antenna, for example by about 5-15 dB, for example by about 10 dB.

In various embodiments, at step 608, the RFID reading circuitry determines that the fault in the RFID system comprises a bias voltage failure in the second antenna when the RFID reading circuitry receives the second return radiation from the IC tag of the second antenna.

In various embodiments, when the RFID reading circuitry receives the first return radiation from the IC tag of the second antenna, if the power level indicator of the RF signal of the second antenna is less than the RF signal power threshold, at step 610, the RFID reading circuitry is configured to determine the fault in the RFID system includes and/or is an RF signal failure in the second antenna. In various embodiments, the RFID reading circuitry determines whether the power level indicator of the RF signal of the second antenna is less than the RF signal power threshold, using the first input to the IC tag of the second antenna.

In various embodiments, when the RFID reading circuitry receives the first return radiation from the IC tag of the second antenna, if the power level indicator of the RF signal of the second antenna is equal to or greater than the RF signal power threshold, at step 612, the RFID reading circuitry determines that the fault in the RFID system includes and/or is a fault in the radiating element of the second antenna, if the power level indicator of the RF signal of the second antenna is equal to or greater than the RF signal power threshold, using the first input to the IC tag of the second antenna.

Figure 7B:
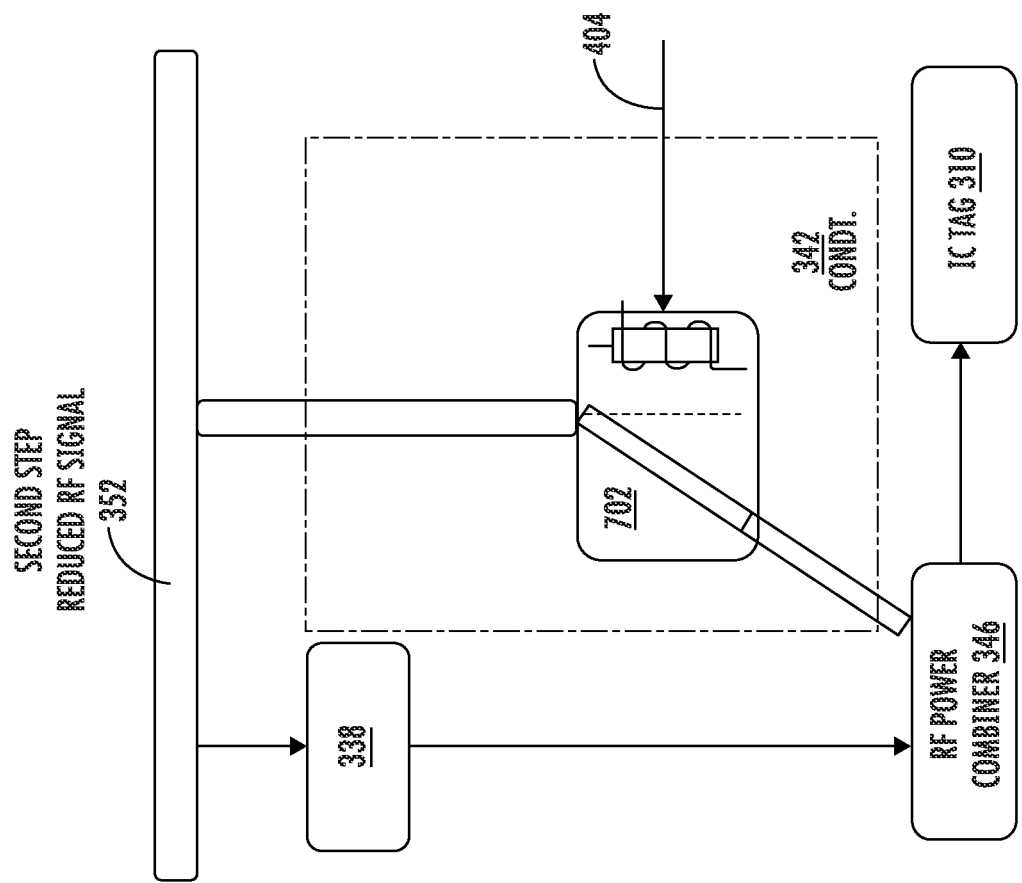
FIG. 7B illustrates an example schematic diagram depicting various components of an antenna of the RFID system in accordance with various embodiments of the present disclosure.
Figure 7A:
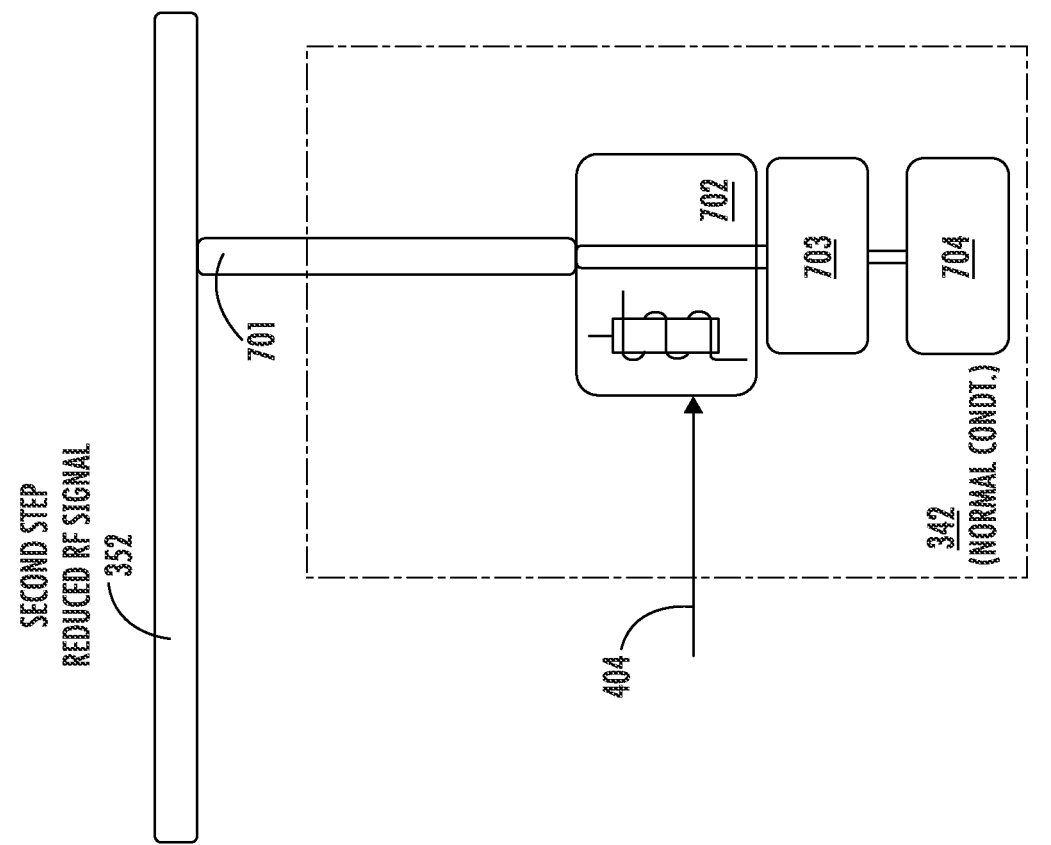
FIG. 7A illustrates an example schematic diagram depicting various components of an antenna of the RFID system in accordance with various embodiments of the present disclosure.

Referring now to FIG. 7A, a schematic diagram illustrating an RF fault bypass circuit 342 is provided in accordance with various embodiments of the present disclosure. In various embodiments, the RF fault bypass circuit 342 includes an electromechanical switch 702. In various embodiments, when the bias voltage 404 is equal to or above the bias voltage threshold, the electromechanical switch is configured to provide a switching function such that the second step reduced RF signal provided to an input 701 of the RF fault bypass circuit faces an approximate open circuit. In various embodiments, when the bias voltage 404 is equal to or above the bias voltage threshold, the electromechanical switch switches the input 701 to a quarter wavelength impedance transformer 703 electronically coupled to a capacitance circuitry 704.

In example embodiments, the capacitance circuitry 704 includes a capacitor with a capacitance in the range of 10-200 pf, 50-150 pf, or for example with a capacitance of approximately 100 pf. In example embodiments, the quarter wavelength impedance transformer 703 transforms the impedance of the capacitor 704 so the RF signal on the input 701 faces an approximate open circuit.

Referring now to FIG. 7B, a schematic diagram illustrating an RF fault bypass circuit 342 is provided in accordance with various embodiments of the present disclosure. In various embodiments, the RF fault bypass circuit 342 includes the electromechanical switch 702. In various embodiments, when the bias voltage 404 is below the bias voltage threshold, the electromechanical switch switches the input 701 to an output of the RF fault bypass circuit 342 which is electronically coupled to the RF power combiner 346. Therefore, in various embodiments, when the bias voltage 404 is below the bias voltage threshold, the electromechanical switch is configured to provide a switching function such that the second step reduced RF signal provided to an input 701 of the RF fault bypass circuit faces an approximate short circuit to the output of the RF fault bypass circuit 342 coupled to the power combiner 346. In various embodiments, the second attenuating coupler 338 is bypassed by the RF fault bypass circuit 342 when the bias voltage 404 is below the bias voltage threshold.

In various embodiments, referring to FIGS. 1-7B, an RFID system 100 is provided in accordance with various embodiments of the present disclosure. In various embodiments, the RFID system 100 includes a plurality of antennas, for example including first antenna 210 and second antenna 212. In various embodiments, the first antenna 210 and the second antenna 212 may be placed in any locations in the chain of antennas 204. In various embodiments, each antenna of the plurality of antennas includes an RF power comparator (for example including or similar to the RF power comparator 330 of the first antenna), a bias voltage comparator (for example including or similar to the bias voltage comparator 334 of the first antenna), and an RF fault bypass circuit (for example including or similar to the RF fault bypass circuit 342 of the first antenna).

In various embodiments, the RF power comparator of each antenna is configured to compare the power level indicator of the RF signal of the antenna with an RF signal power threshold. In various embodiments, the bias voltage comparator is configured to compare a bias voltage of the antenna with a bias voltage threshold.

In various embodiments, the RF fault bypass circuit configured to function as an approximate open circuit when the bias voltage of the antenna is equal to or higher than the bias voltage threshold and function as an approximate short circuit when the bias voltage of the antenna is lower than the bias voltage threshold.

In various embodiments, the RFID system 100 includes an RFID reading circuitry 202. In various embodiments, the RFID reading circuitry 202 is configured to determine a fault in the RFID system using any of the RF power comparison, bias voltage comparison, and function of the RF fault bypass circuit as for example using the method 600 described with reference to FIG. 6.

Figure 8:
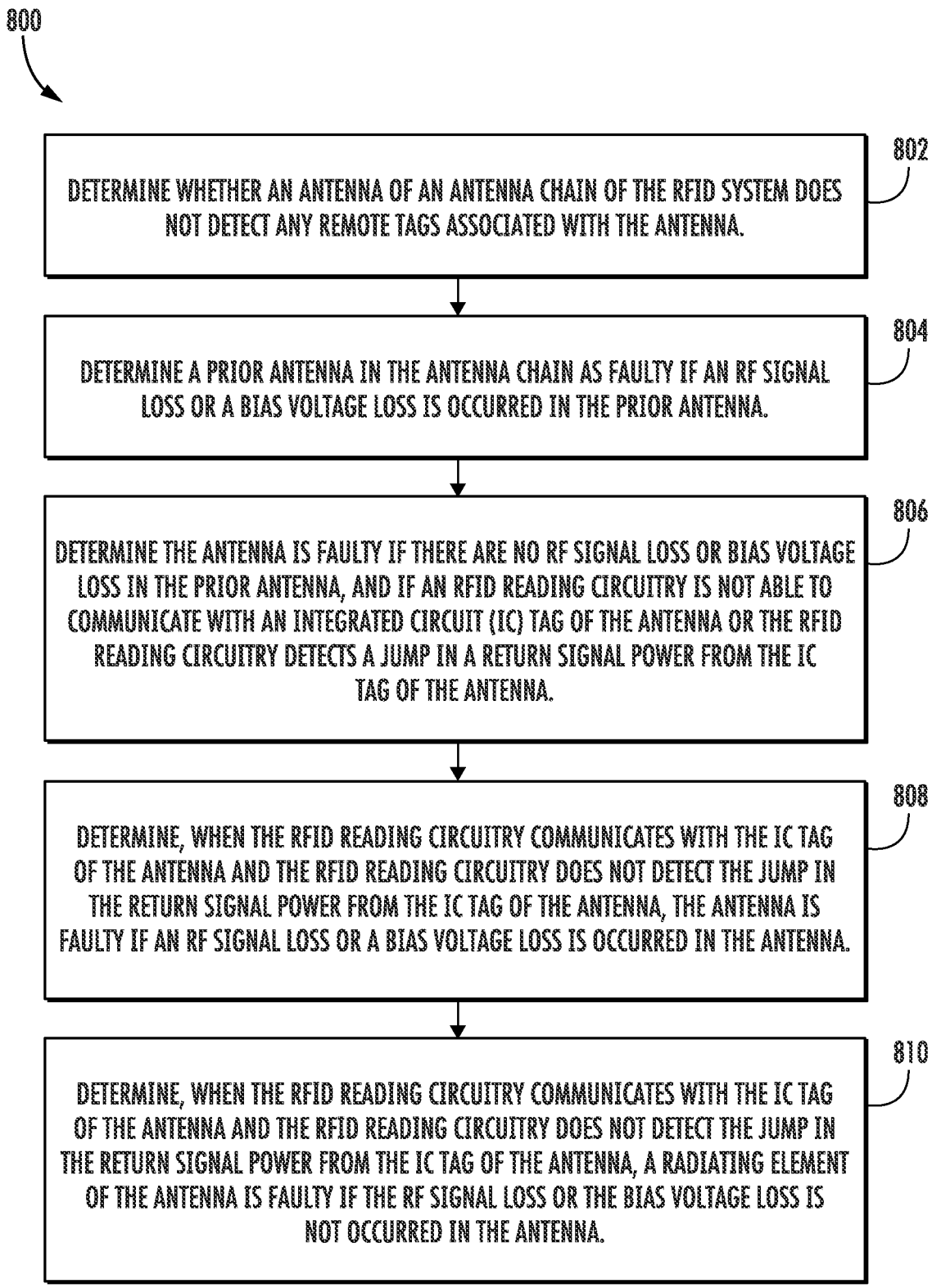
FIG. 8 illustrates a flowchart diagram illustrating example operations in accordance with various embodiments of the present disclosure.

Referring now to FIG. 8, a flowchart illustrating a method 800 is provided in accordance with various embodiments of the present disclosure.

In example embodiments, the method 800 may be performed by one or more components of an RFID system. The RFID system may be similar to the RFID system 100 described above. The RFID system may include a controller 1000 as described below with reference FIG. 10. In some examples, the memory of the controller of the RFID system may store computer program instructions implementing the method 800. In various embodiments, various components of the RFID system 100, for example the RFID reading circuitry 202, include the controller and/or are implemented using the controller.

In various embodiments, at step 802, a controller determines a failure by an antenna of an antenna chain of the RFID system 100 in detecting a remote tag associated with the antenna.

In various embodiments, at step 804, the controller determines a prior antenna in the antenna chain as faulty if an RF signal loss or a bias voltage loss is occurred in the prior antenna. In various embodiments, at step 806, the controller determines the antenna is faulty if there are no RF signal loss or bias voltage loss in the prior antenna, and if an RFID reading circuitry is not able to communicate with an integrated circuit (IC) tag of the antenna or the RFID reading circuitry detects a jump in a return signal power from the IC tag of the antenna.

In various embodiments, at step 808, the controller determines, determines, when the RFID reading circuitry communicates with the IC tag of the antenna and the RFID reading circuitry does not detect the jump in the return signal power from the IC tag of the antenna, the antenna is faulty if an RF signal loss or a bias voltage loss is occurred in the antenna.

In various embodiments, at step 810, the controller determines when the RFID reading circuitry communicates with the IC tag of the antenna and the RFID reading circuitry does not detect the jump in the return signal power from the IC tag of the antenna, a radiating element of the antenna is faulty if the RF signal loss or the bias voltage loss is not occurred in the antenna.

Figure 9:
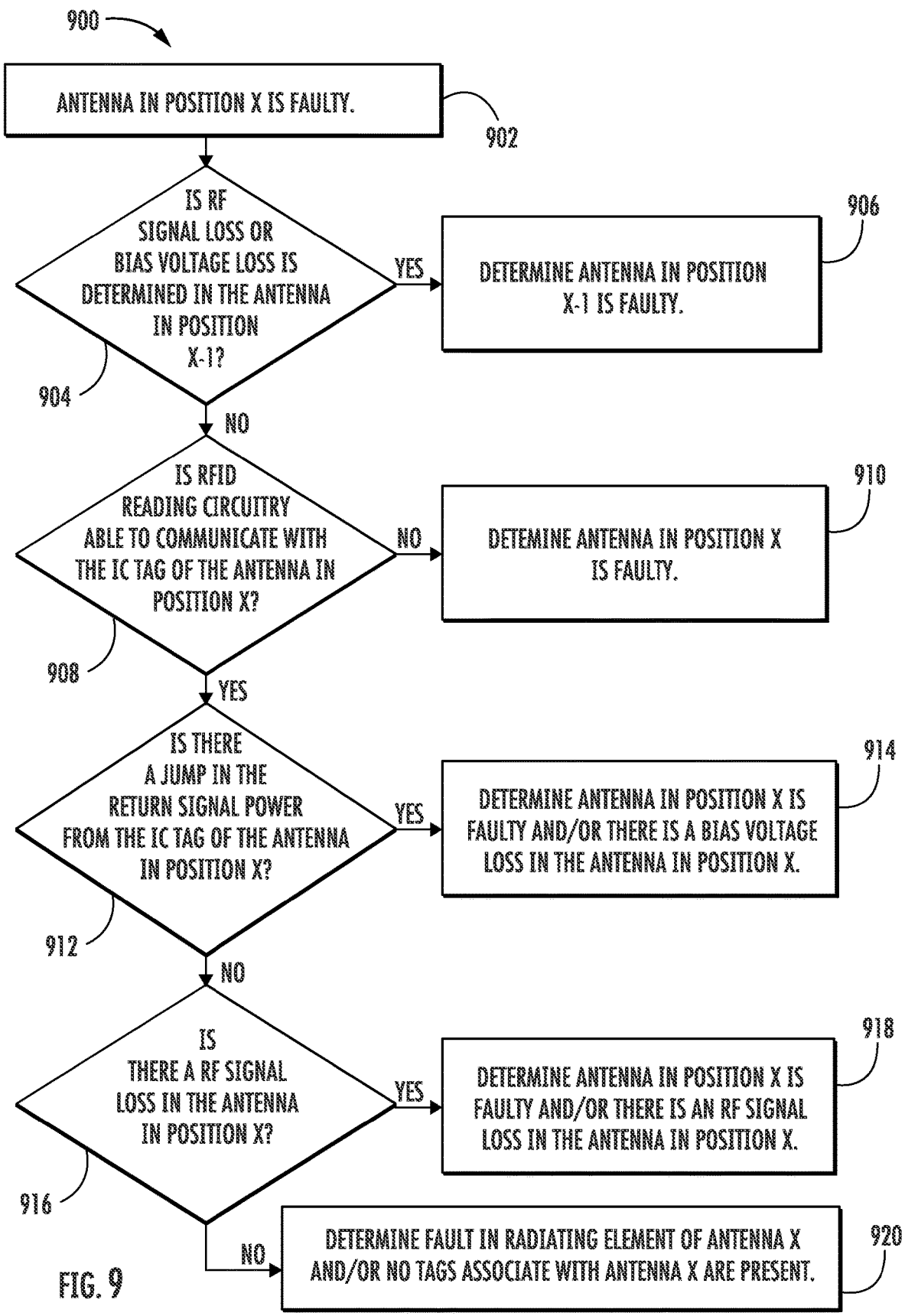
FIG. 9 illustrates a flowchart diagram illustrating example operations in accordance with various embodiments of the present disclosure.

Referring now to FIG. 9, a flowchart illustrating a method 900 is provided in accordance with various embodiments of the present disclosure. In example embodiments, the method 900 may be performed by one or more components an RFID system. The RFID system may be similar to the RFID system 100 described above. The RFID system may include a controller 1000 as described below with reference FIG. 10. In some examples, the memory of the controller of the RFID system may store computer program instructions for implementing the method 900. In various embodiments, various components of the RFID system 100, for example the RFID reading circuitry 202, include the controller and/or are implemented using the controller.

In various embodiments, at step 902, a controller determines that an antenna in a position X of an antenna chain is faulty. In various embodiments, a faulty antenna may be determined when no remote tags associated to the antenna are detected. In various embodiments, a faulty antenna may be detected when the RFID reader cannot query and/or communicate with the IC tag of the antenna.

In various embodiments, at step 904, the controller determines whether an RF signal loss or a bias voltage loss is determined in the antenna in position X−1. If so, at step 906, the controller determined that the antenna in position X−1 and/or antennas in position X−1 onwards are faulty. In various embodiments, the controller determines and/or generates an output indicating whether the RF signal or the bias voltage loss has occurred in antenna in position X−1. In various embodiments, visual indicators indicating RF signal and/or bias voltage loss on the antenna in position X−1 may be used to determine and locate the RF signal and/or bias voltage loss. In various embodiments, the controller repeats the above steps for antennas in position X−2, etc.

In various embodiments, if at step 904, the controller determines that an RF signal loss or a bias voltage loss are not present in the antenna in position X−1, the controller at step 908 determines whether it can communicate with the IC tag of the antenna in position X. In example embodiments, at step 908, the RFID reading circuitry 202 determines whether it can communicate with the IC tag of the antenna in position X.

In various embodiments, if the controller is not able to communicate with the IC tag of the antenna at position X, the controller determines that the antenna in position X, and/or the antenna in position X and onwards are faulty. In various embodiments, the controller determines at step 910, that an RF cable between antennas in positions X an X−1 is faulty, an RF switch of antenna X−1 is faulty, or an output of antenna X−1 is faulty. In various embodiments, at step 910, the controller determines that either both the RF signal and the bias voltage are lost in antenna in position X, or only the RF signal is lost in antenna in position X. For example, the controller may determine that the RF switch of antenna in position X−1 is faulty, hence no RF signal is reaching the antenna in position X. In various embodiments, at step 910, the controller may use first and second inputs to the IC tag of the antenna in position X to determine whether the RF signal and/or the bias voltage of the antenna in position X are lost.

In various embodiments, when the controller determines that it can communicate with the IC tag of the antenna in position X, at step 912 the controller determines whether there is a jump in a return signal power from the IC tag of the antenna in position X. In example embodiments, the jump in signal power may be between 5-15 dB, for example about 10 dB. In various embodiments, if the controller detects the jump, at step 914, the controller determines that the antenna in position X is faulty and there is a bias voltage loss in antenna in position X. In various embodiments, when the controller can communicate with the antenna in position X, the steps 912 and 914 diagnose the system further to find out whether there is the jump in the return signal power from the IC tag of the antenna in position X. In various embodiments, the determination of fault using the jump in the return signal power from the IC tag is at a higher priority compared with determining the first and second inputs to the IC tag of the antenna in position X.

In various embodiments, if the controller does not detect a jump in the RF signal power (hence no loss of the bias voltage in antenna of position X), at step 916, the controller determines whether there is an RF loss in the antenna in position X. In various embodiments, the controller determines whether there is an RF loss in the antenna in position X using the first input to the IC tag of the antenna in position X. The controller may determine the first input to the IC tag of the antenna in position X by querying the IC tag of the antenna in position X.

In various embodiments, if the controller determines an RF signal loss in the antenna of position X, the controller at step 918 determines that the antenna in position X is faulty and/or the antenna in position X and following antennas are faulty. In various embodiments, the RF signal loss visual indicators on the antenna in position X and the following antennas may be used to determine which antenna is faulty.

In various embodiments, if the controller determines that there is no RF signal loss in the antenna of position X, the controller at step 920 determines that there is a fault with the radiating element of the antenna of position X and/or there are no remote tags associated with antenna X are present.

Figure 10:
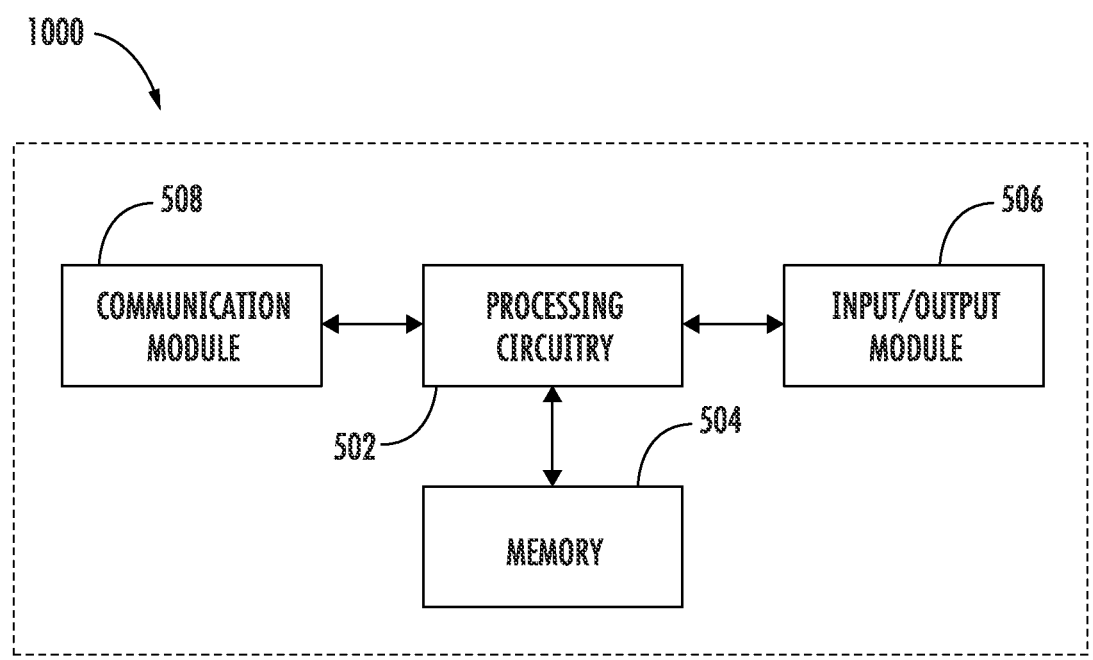
FIG. 10 illustrates an example schematic diagram depicting a controller in accordance with various embodiments of the present disclosure.

Referring now to FIG. 10, a schematic diagram depicting an example controller 1000 of an example apparatus in electronic communication with various other components in accordance with various embodiments of the present disclosure is provided. For example, as described herein, the controller 1000 may be in electronic communications with any of the components of the RFID system 100 and/or any of the components of the RFID system 100 may include a controller. As shown, the controller 1000 comprises processing circuitry 502, a communication module 508, input/output module 506, a memory 504 and/or other components configured to perform various operations, procedures, functions or the like described herein.

In various embodiments, referring to FIGS. 1-7B, the controller 1000 (such as the processing circuitry 502, communication module 508, input/output module 506 and memory 504) is electrically coupled to and/or in electronic communication with various components of the RFID system. In various embodiments, the RFID reading circuitry 202 may include the controller 1000 and/or the processing circuitry 502.

The processing circuitry 502 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 502 may comprise one or more processors. In one exemplary embodiment, the processing circuitry 502 is configured to execute instructions stored in the memory 504 or otherwise accessible by the processing circuitry 502. When executed by the processing circuitry 502, these instructions may enable the controller 1000 to execute one or a plurality of the functions as described herein. No matter whether it is configured by hardware, firmware/software methods, or a combination thereof, the processing circuitry 502 may comprise entities capable of executing operations according to the embodiments of the present invention when correspondingly configured. Therefore, for example, when the processing circuitry 502 is implemented as an ASIC, an FPGA, or the like, the processing circuitry 502 may comprise specially configured hardware for implementing one or a plurality of operations described herein. Alternatively, as another example, when the processing circuitry 502 is implemented as an actuator of instructions (such as those that may be stored in the memory 504), the instructions may specifically configure the processing circuitry 502 to execute one or a plurality of methods, algorithms and operations described herein, such as those discussed with reference to any of the flowcharts herein.

The memory 504 may comprise, for example, a volatile memory, a non-volatile memory, or a certain combination thereof. Although illustrated as a single memory in FIG. 5, the memory 504 may comprise a plurality of memory components. In various embodiments, the memory 504 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 504 may be configured to store information, data, application programs, instructions, and etc., so that the controller 1000 can execute various functions according to the embodiments of the present disclosure. For example, in at least some embodiments, the memory 504 is configured to cache input data for processing by the processing circuitry 502. Additionally or alternatively, in at least some embodiments, the memory 504 is configured to store program instructions for execution by the processing circuitry 502. The memory 504 may store information in the form of static and/or dynamic information. When the functions are executed, the stored information may be stored and/or used by the controller 1000.

The communication module 508 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 504) and executed by a controller 1000 (for example, the processing circuitry 502). In some embodiments, the communication module 508 (as with other components discussed herein) may be at least partially implemented as the processing circuitry 502 or otherwise controlled by the processing circuitry 502. In this regard, the communication module 508 may communicate with the processing circuitry 502, for example, through a bus. The communication module 508 may comprise, for example, antennas, transmitters, receivers, transceivers, network interface cards and/or supporting hardware and/or firmware/software, and is used for establishing communication with another apparatus. The communication module 508 may be configured to receive and/or transmit any data that may be stored by the memory 504 by using any protocol that can be used for communication between apparatuses. The communication module 508 may additionally or alternatively communicate with the memory 504, the input/output module 506 and/or any other component of the controller 1000, for example, through a bus.

In some embodiments, the controller 1000 may comprise an input/output module 506. The input/output module 506 may communicate with the processing circuitry 502 to receive instructions input by the user and/or to provide audible, visual, mechanical or other outputs to the user. Therefore, the input/output module 506 may be in electronic communication with supporting devices, such as a keyboard, a mouse, a display, a touch screen display, and/or other input/output mechanisms. Alternatively, at least some aspects of the input/output module 506 may be implemented on a device used by the user to communicate with the controller 1000. The input/output module 506 may communicate with the memory 504, the communication module 508 and/or any other component, for example, through a bus. One or a plurality of input/output modules and/or other components may be included in the controller 1000.

In some examples, one or more of the procedures and/or methods described herein, for example in FIG. 6, 8, 9 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A radio frequency identification (RFID) system comprising:
    a first antenna comprising:
        a radio frequency (RF) switch of the first antenna configured to:
            receive a switch RF signal of the first antenna; and
            switch the switch RF signal of the first antenna to a radiating element of the first antenna or to an output of the first antenna;

an integrated circuit (IC) tag of the first antenna configured to control the RF switch of the first antenna; and an RF fault bypass circuit of the first antenna configured to increase a power of an RF input signal to the IC tag of the first antenna when a bias voltage of the first antenna falls below a bias voltage threshold;

an RFID reading circuitry configured to:
provide an RF signal of the first antenna and the bias voltage of the first antenna; and
determines whether a fault in the RFID system exists using any of the bias voltage of the first antenna, a power level indicator of the RF signal of the first antenna, and the increase in the power of the RF input signal to the IC tag of the first antenna;

a first attenuating coupler of the first antenna configured to attenuate the RF signal of the first antenna to generate a first attenuated RF signal of the first antenna and a first step reduced RF signal of the first antenna;

an RF power detector of the first antenna configured to receive the first attenuated RF signal of the first antenna and generate the power level indicator of the RF signal of the first antenna;

an RF power comparator of the first antenna configured to:
compare the power level indicator of the RF signal of the first antenna with a RF signal power threshold; and
generate a first input to the IC tag of the first antenna using a comparison of the power level indicator of the RF signal of the first antenna and the RF signal power threshold; and an RF signal loss visual indicator of the first antenna configured to:
receive the first input to the IC tag of the first antenna; and
visually indicate whether the power level indicator of the RF signal of the first antenna is less than the RF signal power threshold.

2. The RFID system of claim 1, comprising one or more remote tags corresponding to the first antenna each configured to, when the RF switch of the first antenna switches the switch RF signal of the first antenna to the radiating element of the first antenna:
receive a radiation from the radiating element of the first antenna; and
emit a return radiation to the radiating element of the first antenna,
wherein the RFID reading circuitry is configured to identify each of the one or more remote tags corresponding to the first antenna or indicate a presence of each of the one or more remote tags corresponding to the first antenna, using the return radiation from the corresponding each of the one or more remote tags corresponding to the first antenna.

3. The RFID system of claim 1, comprising:
a bias voltage comparator of the first antenna configured to:
compare the bias voltage of the first antenna with the bias voltage threshold;
generate a second input to the IC tag of the first antenna using a comparison of the bias voltage of the first antenna and the bias voltage threshold; and
a bias voltage loss visual indicator of the first antenna configured to:
receive the second input to the IC tag of the first antenna; and
visually indicate whether the bias voltage of the first antenna is less than the bias voltage threshold.

4. The RFID system of claim 3, comprising:
a second attenuating coupler of the first antenna configured to attenuate the first step reduced RF signal of the first antenna to generate a second attenuated RF signal of the first antenna and a second step reduced RF signal of the first antenna; and
an RF power combiner of the first antenna configured to combine an output signal of the RF fault bypass circuit of the first antenna with the second attenuated RF signal of the first antenna.

5. The RFID system of claim 4, wherein, when the bias voltage of the first antenna is above the bias voltage threshold:
the switch RF signal of the first antenna is approximately equal to the second step reduced RF signal of the first antenna;
the output signal of the RF fault bypass circuit of the first antenna is approximately zero; and
the IC tag of the first antenna operates in a semi-passive mode and emits a first return radiation from the IC tag of the first antenna.

6. The RFID system of claim 5, wherein, when the bias voltage of the first antenna falls below the bias voltage threshold:
the output signal of the RF fault bypass circuit of the first antenna is approximately equal to the second step reduced RF signal of the first antenna; and
the IC tag of the first antenna operates in a passive mode and emits a second return radiation from the IC tag of the first antenna, wherein a power level of the second return radiation from the IC tag of the first antenna is greater than a power level of the first return radiation from the IC tag of the first antenna.

7. The RFID system of claim 6, comprising:
a second antenna electronically coupled to the output of the first antenna, the second antenna comprising:
an RF switch of the second antenna configured to:
receive a switch RF signal of the second antenna; and
switch the switch RF signal of the second antenna to a radiating element of the second antenna or to an output of the second antenna;
an IC tag of the second antenna configured to control the RF switch of the second antenna; and
an RF fault bypass circuit of the second antenna configured to increase a power of an RF input signal to the IC tag of the second antenna when a bias voltage of the second antenna falls below the bias voltage threshold,
wherein the second antenna is configured to:
receive an RF signal of the second antenna from the output of the first antenna when the RF switch of the first antenna switches the switch RF signal of the first antenna to the output of the first antenna; and
receive the bias voltage of the second antenna from the output of the first antenna.

8. The RFID system of claim 7, comprising one or more remote tags corresponding to the second antenna each configured to, when the RF switch of the second antenna switches the switch RF signal of the second antenna to the radiating element of the second antenna:
receive a radiation from the radiating element of the second antenna; and emit a return radiation to the radiating element of the second antenna,
wherein the RFID reading circuitry is configured to identify each of the one or more remote tags corresponding to the second antenna or indicate a presence of the one or more remote tags corresponding to the second antenna, using the return radiation from the corresponding each of the one or more remote tags corresponding to the second antenna.

9. The RFID system of claim 8, comprising:
a first attenuating coupler of the second antenna configured to attenuate the RF signal of the second antenna to generate a first attenuated RF signal of the second antenna and a first step reduced RF signal of the second antenna;
an RF power detector of the second antenna configured to receive the first attenuated RF signal of the second antenna and generate a power level indicator of the RF signal of the second antenna;
an RF power comparator of the second antenna configured to:
compare the power level indicator of the RF signal of the second antenna with the RF signal power threshold; and
generate a first input to the IC tag of the second antenna using a comparison of the power level indicator of the RF signal of the second antenna and the RF signal power threshold; and
an RF signal loss visual indicator of the second antenna configured to:
receive the first input to the IC tag of the second antenna; and
visually indicate whether the power level indicator of the RF signal of the second antenna is less than the RF signal power threshold.

10. The RFID system of claim 9, comprising:
a bias voltage comparator of the second antenna configured to:
compare the bias voltage of the second antenna with the bias voltage threshold;
generate a second input to the IC tag of the second antenna using a comparison of the bias voltage of the second antenna and the bias voltage threshold; and
a bias voltage loss visual indicator of the second antenna configured to:
receive the second input to the IC tag of the second antenna; and
visually indicate whether the bias voltage of the second antenna is less than the bias voltage threshold.

11. The RFID system of claim 10, comprising:
a second attenuating coupler of the second antenna configured to attenuate the first step reduced RF signal of the second antenna to generate a second attenuated RF signal of the second antenna and a second step reduced RF signal of the second antenna; and
an RF power combiner of the second antenna configured to combine an output signal of the RF fault bypass circuit of the second antenna with the second attenuated RF signal of the second antenna.

12. The RFID system of claim 11, wherein, when the bias voltage of the second antenna is above the bias voltage threshold:
the switch RF signal of the second antenna is approximately equal to the second step reduced RF signal of the second antenna;
the output signal of the RF fault bypass circuit of the second antenna is approximately zero; and
the IC tag of the second antenna operates in a semi-passive mode and emits a first return radiation from the IC tag of the second antenna.

13. The RFID system of claim 12, wherein, when the bias voltage of the second antenna falls below the bias voltage threshold:
the output signal of the RF fault bypass circuit of the second antenna is approximately equal to the second step reduced RF signal of the second antenna; and
the IC tag of the second antenna operates in a passive mode and emits a second return radiation from the IC tag of the second antenna, wherein a power level of the second return radiation from the IC tag of the second antenna is greater than a power level of the first return radiation from the IC tag of the second antenna.

14. The RFID system of claim 13, wherein the RFID reading circuitry is configured to, when not receiving the return radiation in response to the radiation from the radiating element of the second antenna or when not receiving the first return radiation from the IC tag of the second antenna:
determine the fault in the RFID system comprises an RF signal failure in the first antenna if the power level indicator of the RF signal of the first antenna is less than the RF signal power threshold, using the first input to the IC tag of the first antenna; and
determine the fault in the RFID system comprises a bias voltage failure in the first antenna if the bias voltage of the first antenna is less than the bias voltage threshold, using the second input to the IC tag of the first antenna.

15. The RFID system of claim 14, wherein the RFID reading circuitry is configured to, when the power level indicator of the RF signal of the first antenna is equal to or greater than the RF signal power threshold and the bias voltage of the first antenna is equal to or greater than the bias voltage threshold:
determine whether the RFID reading circuitry can communicate with the IC tag of the second antenna; and
determine the fault in the RFID system comprises any of a fault in a connection between the first and second antenna and a fault in the RF switch of the first antenna, when the RFID reading circuitry cannot communicate with the IC tag of the second antenna.

16. The RFID system of claim 15, wherein the RFID reading circuitry is configured to, when the RFID reading circuitry can communicate with the IC tag of the second antenna:
determine whether the RFID reading circuitry receives the second return radiation from the IC tag of the second antenna; and
determine the fault in the RFID system comprises a bias voltage failure in the second antenna when the RFID reading circuitry receives the second return radiation from the IC tag of the second antenna.

17. The RFID system of claim 15, wherein the RFID reading circuitry is configured to, when the RFID reading circuitry receives the first return radiation from the IC tag of the second antenna:
determine the fault in the RFID system comprises an RF signal failure in the second antenna if the power level indicator of the RF signal of the second antenna is less than the RF signal power threshold, using the first input to the IC tag of the second antenna; and determine the fault in the RFID system comprises a fault in the radiating element of the second antenna, if the power level indicator of the RF signal of the second antenna is equal to or greater than the RF signal power threshold, using the first input to the IC tag of the second antenna.

18. A radio frequency identification (RFID) system comprising:
a plurality of antennas, each antenna comprising:
a radio frequency (RF) power comparator configured to compare a power level indicator of a RF signal of the antenna with a RF signal power threshold;
a bias voltage comparator configured to compare a bias voltage of the antenna with a bias voltage threshold;
an RF fault bypass circuit configured to:
function as an approximate open circuit when the bias voltage of the antenna is equal to or higher than the bias voltage threshold;
function as an approximate short circuit when the bias voltage of the antenna is lower than the bias voltage threshold;
an RFID reading circuitry configured to determine a fault in the RFID system using any of a RF power comparison, bias voltage comparison, and function of the RF fault bypass circuit;
a first attenuating coupler of a first antenna configured to attenuate the RF signal of the first antenna to generate a first attenuated RF signal of the first antenna and a first step reduced RF signal of the first antenna;
an RF power detector of the first antenna configured to receive the first attenuated RF signal of the first antenna and generate the power level indicator of the RF signal of the first antenna;
an RF power comparator of the first antenna configured to:
compare the power level indicator of the RF signal of the first antenna with the RF signal power threshold; and
generate a first input to an IC tag of the first antenna using the comparison of the power level indicator of the RF signal of the first antenna and the RF signal power threshold; and
a RF signal loss visual indicator of the first antenna configured to:
receive the first input to the IC tag of the first antenna; and
visually indicate whether the power level indicator of the RF signal of the first antenna is less than the RF signal power threshold.

19. A method for determining a fault in a radio frequency identification (RFID) system comprising:
determining a failure by an antenna of an antenna chain of the RFID system in detecting a remote tag associated with the antenna;
determining a prior antenna in the antenna chain as faulty if a radio frequency (RF) signal loss or a bias voltage loss is occurred in the prior antenna;
determining the antenna is faulty if there are no RF signal loss or bias voltage loss in the prior antenna, and if an RFID reading circuitry is not able to communicate with an integrated circuit (IC) tag of the antenna or the RFID reading circuitry detects a jump in a return signal power from an IC tag of the antenna; and
determining, when the RFID reading circuitry communicates with the IC tag of the antenna and the RFID reading circuitry does not detect the jump in the return signal power from an IC tag of the antenna:
the antenna is faulty if an RF signal loss or a bias voltage loss is occurred in the antenna; and
a radiating element of the antenna is faulty if the RF signal loss or the bias voltage loss is not occurred in the antenna;
attenuating, by a first attenuating coupler of a first antenna, the RF signal of the first antenna to generate a first attenuated RF signal and a first step-reduced RF signal of the first antenna;
receiving, by an RF power detector of the first antenna, the first attenuated RF signal of the first antenna; and
generating, by the RF power detector, a power level indicator of the RF signal of the first antenna;
comparing, by a RF power comparator of the first antenna, a power level indicator of the RF signal of the first antenna with a predefined RF signal power threshold;
generating, by the RF power detector, a power level indicator of the RF signal of the first antenna;
generating, by the RF power comparator, a first input to an (IC) tag of the first antenna based on the comparison of the power level indicator and the RF signal power threshold;
receiving, by a RF signal loss visual indicator of the first antenna, the first input to the IC tag of the first antenna; and
visually indicating, by the RF signal loss visual indicator, whether the power level indicator of the RF signal of the first antenna is less than the RF signal power threshold.

* * * * *